United States Patent
Park et al.

(10) Patent No.: US 9,779,687 B2
(45) Date of Patent: Oct. 3, 2017

(54) DEVICE AND METHOD FOR TRANSMITTING AND RECEIVING DATA USING HDMI

(71) Applicant: LG ELECTRONICS INC., Seoul (KR)

(72) Inventors: Jangwoong Park, Seoul (KR); Hyeonjae Lee, Seoul (KR); Hyunsik Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/125,939

(22) PCT Filed: Mar. 12, 2015

(86) PCT No.: PCT/KR2015/002418
§ 371 (c)(1),
(2) Date: Sep. 13, 2016

(87) PCT Pub. No.: WO2015/137751
PCT Pub. Date: Sep. 17, 2015

(65) Prior Publication Data
US 2017/0092226 A1    Mar. 30, 2017

Related U.S. Application Data

(60) Provisional application No. 61/952,139, filed on Mar. 13, 2014.

(51) Int. Cl.
*H04N 5/765* (2006.01)
*H04N 9/80* (2006.01)
(Continued)

(52) U.S. Cl.
CPC .............. *G09G 5/006* (2013.01); *H04N 5/765* (2013.01); *H04N 21/43635* (2013.01);
(Continued)

(58) Field of Classification Search
CPC .............. G09G 5/006; G09G 2370/12; G09G 2370/047; G09G 2340/02; H04N 5/765; H04N 21/43635
(Continued)

(56) References Cited

U.S. PATENT DOCUMENTS

2008/0252782 A1* 10/2008 Komeno ................. G09G 5/12
348/512
2010/0247059 A1   9/2010 Lee et al.
(Continued)

FOREIGN PATENT DOCUMENTS

| KR | 1020080009063 | 1/2008 |
| KR | 1020100111609 | 10/2010 |
| WO | 2012166512 | 12/2012 |

OTHER PUBLICATIONS

PCT International Application No. PCT/KR2015/002418, International Search Report dated Jun. 10, 2015, 2 pages.

*Primary Examiner* — Robert Chevalier
(74) *Attorney, Agent, or Firm* — Lee, Hong, Degerman, Kang & Waimey PC

(57) ABSTRACT

The present invention discloses a method for transmitting and receiving data of a sink device by using HDMI (High Definition Media Interface). A method for transmitting and receiving data of a source device by using HDMI comprises requesting a sink device to read out EDID (Extended Display Identification Data) when the sink device is connected; receiving from the sink device EDID including decompression capability information of the sink device; transmitting operation parameter information determined on the basis of the EDID, where the operation parameter information includes compression metadata; and transmitting the compressed video data.

20 Claims, 19 Drawing Sheets

(51) Int. Cl.
 *G09G 5/00* (2006.01)
 *H04N 21/4363* (2011.01)
(52) U.S. Cl.
 CPC ... *G09G 2340/02* (2013.01); *G09G 2370/047* (2013.01); *G09G 2370/12* (2013.01)
(58) Field of Classification Search
 USPC ....... 386/231, 200, 210, 230, 326, 328, 355, 386/353
 See application file for complete search history.

(56) References Cited

U.S. PATENT DOCUMENTS

2011/0142427 A1   6/2011  Bhat et al.
2012/0167149 A1*  6/2012  Toba ................ H04N 21/43615
                                                    725/85

* cited by examiner

【Fig. 1】
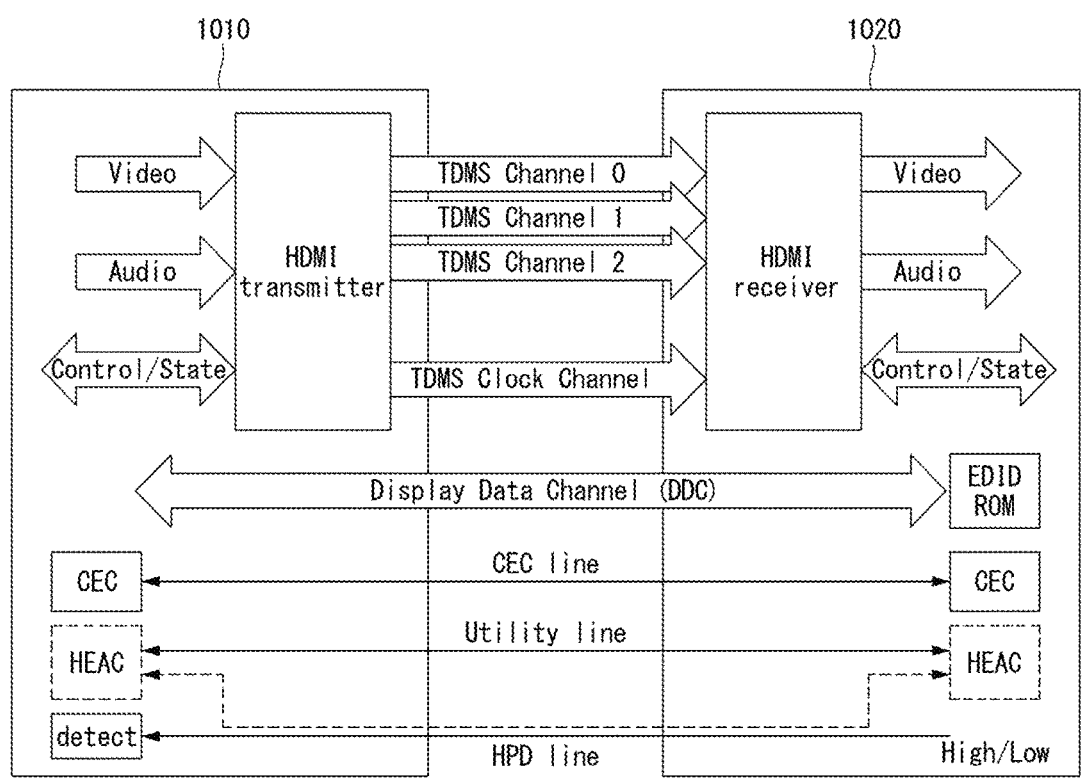

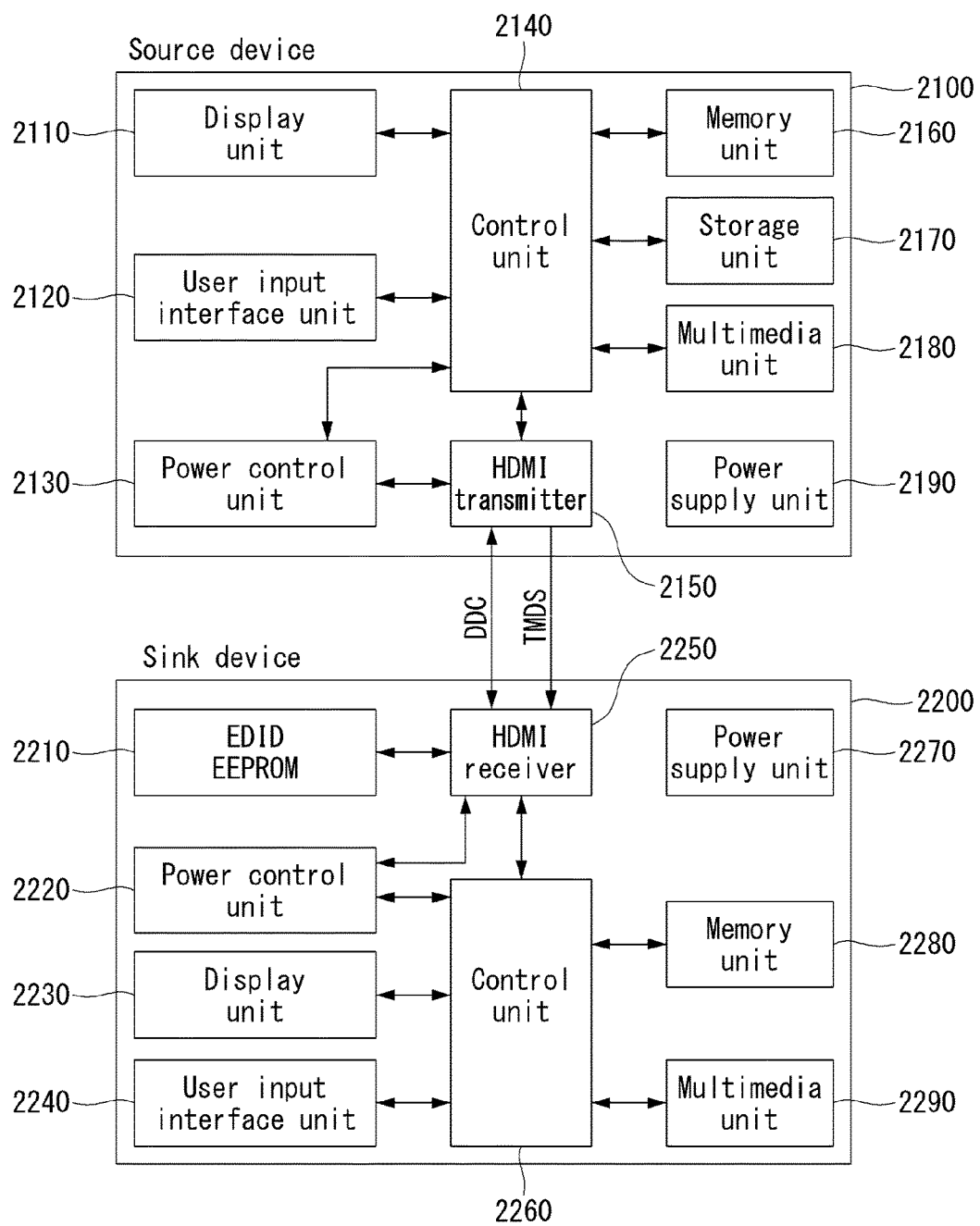

[Fig. 3]

| Address | No. Bytes | Description |
|---|---|---|
| 00h ~ 07h | 8 | Header information. Fixed to 00 FF FF FF FF FF FF 00. |
| 08h ~ 11h | 10 | Vendor/Product identification. Manufacturer, Product code, Serial number, and Date of Manufacture |
| 12h ~ 13h | 2 | EDID structure version/revision |
| 14h ~ 18h | 5 | Basic Display Parameters/Features. Video input definition (analog or digital), Max. Horizontal Image Size, Max. Vertical Image Size, Display Transfer Characteristic(Gamma), Feature Support(Standby, Suspend, Display Type, Standard Default Color space (sRGB), Preferred Timing Mode support and so on) |
| 19h ~ 22h | 10 | Color Characteristics. Information related to color and white point. Express in terms of xy-coordinaes of red, green, blue, and white in the color space. |
| 23h ~ 25h | 3 | Established Timings. Describes commonly used timing mode |
| 26h ~ 35h | 16 | Standard Timings. Describes 8 standard timing descriptors, and one descriptor includes information about range of horizontal active pixel, image aspect ratio, and refresh rate (60 ~ 123 Hz). Timing not belonging to the established timing is described accoridng to the VESA DMT standard or usesthe timing informaiton calculated by using GTF. |
| 36h ~ 7Dh | 72 | Detailed Timing Descriptors. Describes detailed timing information about display resolution, and four descriptors are used. The first descriptor describes preferred detailed timing, the second descriptor describes secondary detailed timing or monitor additional information (serial number, range limites, and name). The remaining two descriptors include monitor additional information. Monitor range limit and name must be described. |
| 7Eh | 1 | Extension Flag. Specifies the number of additional EDID extensin blocks. |
| 7Fh | 1 | Checksum. |

【Fig. 4】

| Byte # | |
|---|---|
| 0 | Tag. 0x02 |
| 1 | Revision Number. 0x03 |
| 2 | Byte number offset d value at which Detailed Timing Descriptor (DTD) of 18 bytes starts |
| 3 | Indication of underscan, audio support, YCBCR 4:4:4 or YCBCR 4:2:2 support, the number of native DTDs supported. |
| 4 | Start of data block collection |
| d-1 | End of data block collection |
| d | Start of 18-byte DTD. Follows the EDID DTD format |
| d+(18*n)-1 | End of 18-byte DTD. n is the number of descriptors included |
| d+(18*n) | Beginning of Padding. 0x00 |
| 126 | End of Padding. 0x00 |
| 127 | Checksum. |

【Fig. 5】

(a) Video Data Block

| Byte # | Bits 5-7 | Bits 0-4 |
|---|---|---|
| 0 | Video Tag Code | The total number of bytes for Short Video Descriptor (L1) |
| 1 | CEA Short Video Descriptor 1 | |
| L1 | CEA Short Video Descriptor L1 | |

(b) Audio Data Block

| Byte # | Bits 5-7 | Bits 0-4 |
|---|---|---|
| 0 | Audio Tag Code | The total number of bytes for Short Audio Descriptor (L2) |
| 1~3 | CEA Short Audio Descriptor 1 | |
| 4~3*L2 | CEA Short Video Descriptor L2/3 | |

(c) Speaker Allocation Data Block

| Byte # | Bits 5-7 | Bits 0-4 |
|---|---|---|
| 0 | Speaker allocation Tag Code | The total number of bytes for Speaker Allocation (L3 = 3) |
| 1~3 | Speaker Allocation Data Block Payload | |

[Fig. 6]

| Byte / Bits # | 7 | 6 | 5 | 4 | 3 | 2 | 1 | 0 |
|---|---|---|---|---|---|---|---|---|
| 0 | Vendor Specific Tag Code (=3) | | | Length(=N) | | | | |
| 1 | IEEE OUI, Third Octet (0xD8) | | | | | | | |
| 2 | IEEE OUI, Second Octet (0x5D) | | | | | | | |
| 3 | IEEE OUI, First Octet (0xC4) | | | | | | | |
| 4 | Version (=1) | | | | | | | |
| 5 | Max_TMDS_Character_Rate | | | | | | | |
| 6 | SCDC_Present | RR_Capable | Rsvd(0) | Rsvd(0) | LTE_340Mcsc_scramble | Indpendent_view | Dual_View | 3D_OSD_Disparity |
| 7 | Rsvd(0) | Rsvd(0) | Rsvd(0) | Rsvd(0) | Rsvd(0) | DC_48bit_420 | DC_36bit_420 | DC_30bit_420 |
| ...N | Reserved (0) | | | | | | | |

【Fig. 7】

(a) HF_VSIF packet header

| Byte/Bits # | 7 | 6 | 5 | 4 | 3 | 2 | 1 | 0 |
|---|---|---|---|---|---|---|---|---|
| 0 | Packet Type = 0x81 | | | | | | | |
| 1 | Version = 0x01 | | | | | | | |
| 2 | 0 | 0 | 0 | Length = Nv | | | | |

(b) HF_VSIF packet contents

| Packet Byte # | 7 | 6 | 5 | 4 | 3 | 2 | 1 | 0 |
|---|---|---|---|---|---|---|---|---|
| PB0 | Checksum | | | | | | | |
| PB1 | IEEE OUI, Third Octet (0xD8) | | | | | | | |
| PB2 | IEEE OUI, Second Octet (0x5D) | | | | | | | |
| PB3 | IEEE OUI, First Octet (0xC4) | | | | | | | |
| PB4 | Version(=1) | | | | | | | |
| PB5 | Rsvd(0) | Rsvd(0) | Rsvd(0) | Rsvd(0) | Rsvd(0) | Rsvd(0) | Rsvd(0) | 3D_Valid |
| (PB6)* | colspan="4" 3D_F_Structure | | | | 3D_Additional_Info_Present | 3D_Disparity_Data_Present | 3D_Meta_present | Rsvd(0) |
| (PB7)* | colspan="4" 3D_F_Ext_Data | | | | colspan="4" Rsvd(0) | | | |
| (PB8)* | Rsvd(0) | Rsvd(0) | Rsvd(0) | 3D_Dual_view | colspan="2" 3D_ViewDependency | | colspan="2" 3D_Preferred2DView | |
| (PB9)* | colspan="4" 3D_DisparityData_Version | | | | colspan="4" 3D_DisparityData_length(J) | | | |
| (PB9+1)* | colspan="8" 3D_DisparityData_1 | | | | | | | |
| ... | ... | | | | | | | |
| (PB9+J)* | colspan="8" 3D_DisparityData_J | | | | | | | |
| (PBm)* | colspan="4" 3D_MetaData_type | | | | colspan="4" 3D_MetaData_length(K) | | | |
| (PBm+1)* | colspan="8" 3D_Metadata_1 | | | | | | | |
| ... | ... | | | | | | | |
| PBm+K* | colspan="8" 3D_Metadata_K | | | | | | | |
| ...PB(Nv) | Rsvd(0) | Rsvd(0) | Rsvd(0) | Rsvd(0) | Rsvd(0) | Rsvd(0) | Rsvd(0) | Rsvd(0) |

【Fig. 8】

| Offset | R/W | Name |
|---|---|---|
| 0x01 | R | Sink Version |
| 0x02 | R/W | Source Version |
| 0x10 | R/W | Update_0 |
| 0x11 | R/W | Update_1 |
| 0x12-0x1F | R | Reserved for Update Related Uses |
| 0x20 | R/W | TMDS_Config |
| 0x21 | R | Scrambler_Status |
| 0x30 | R/W | Config_0 |
| 0x31-0x3F | R | Reserved for Configuration |
| 0x40 | R | Status_Flag_0 |
| 0x41 | R | Status_Flag_1 |
| 0x42-0x4F | R | Reserved for Status Related Uses |
| 0x50 | R | Err_Det_0_L |
| 0x51 | R | Err_Det_0_H |
| 0x52 | R | Err_Det_1_L |
| 0x53 | R | Err_Det_1_H |
| 0x54 | R | Err_Det_2_L |
| 0x55 | R | Err_Det_2_H |
| 0x56 | R | Err_Det_Checksum |
| 0xC0 | R/W | Test_Config_0 |
| 0xC1`0xCF | R | Reserved for test features |
| 0xD0 | R | Manufacturer IEEE OUI, Third Octet |
| 0xD1 | R | Manufacturer IEEE OUI, Second Octet |
| 0xD2 | R | Manufacturer IEEE OUI, First Octet |
| 0xD3-0xDD | R | Device ID |
| 0xDE-0xFF | R/W | Manufacturer Specific |
| All Remaining Offsets | R | Reserved |

【Fig. 9】
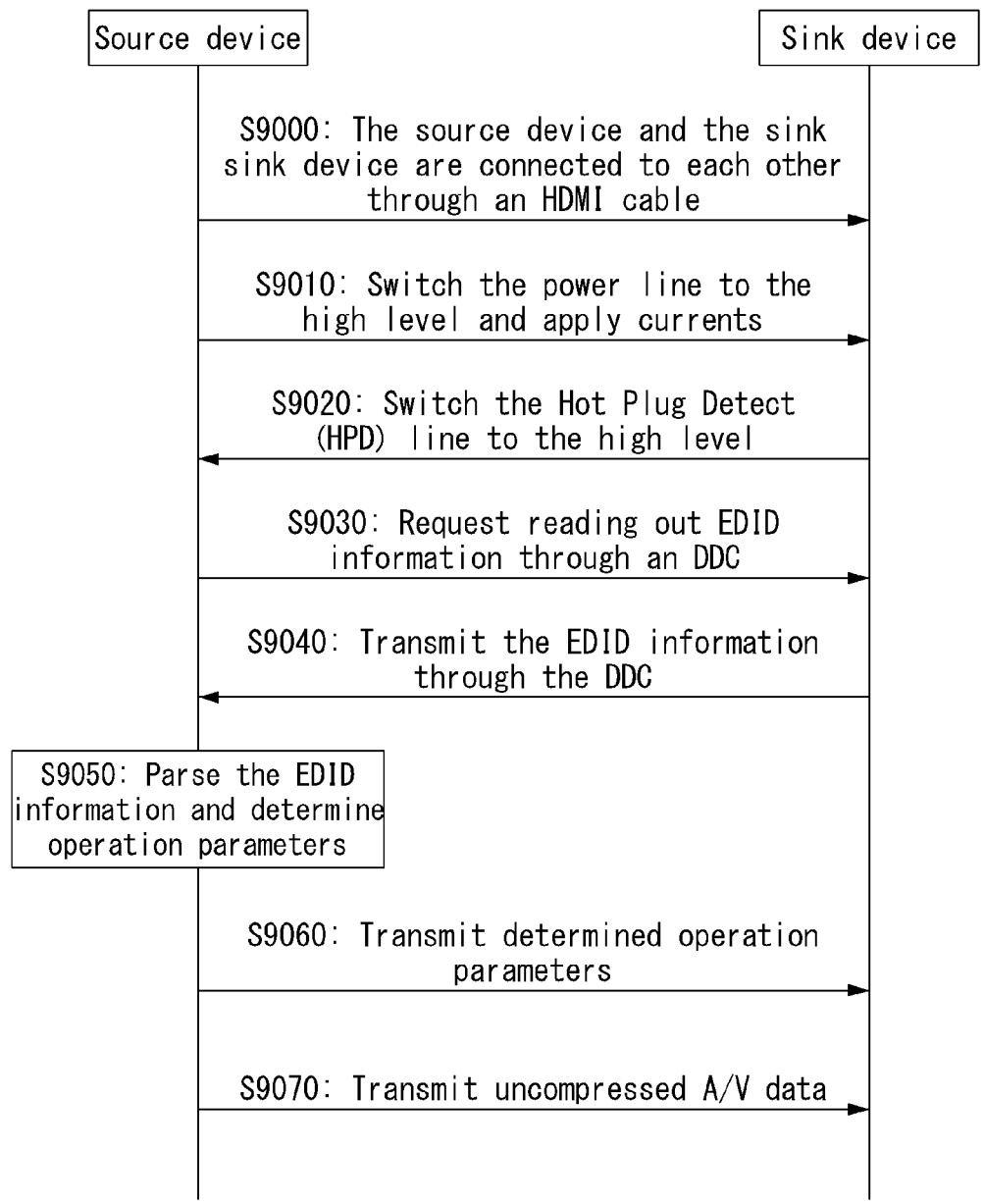

【Fig. 10】
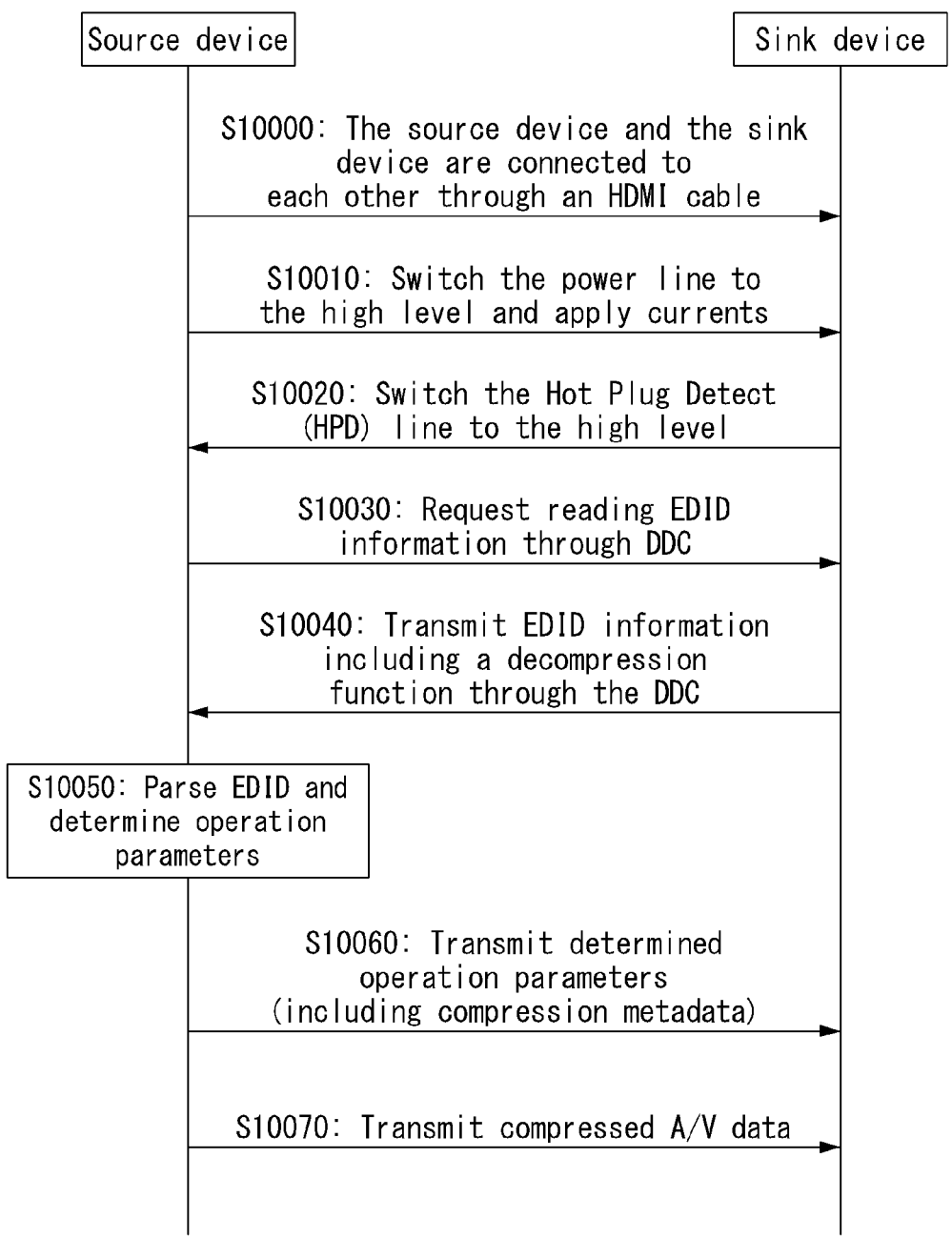

【Fig. 11】
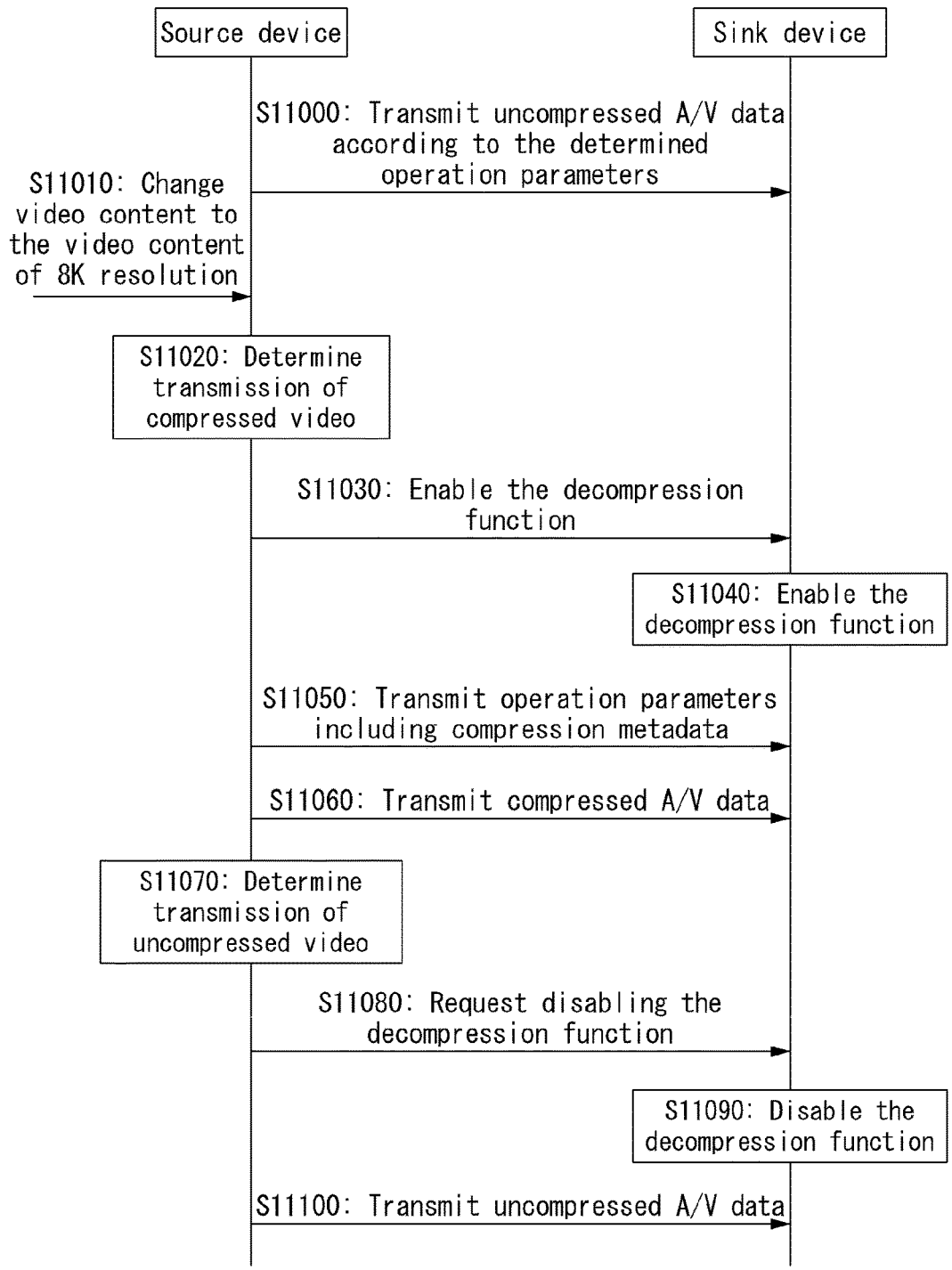

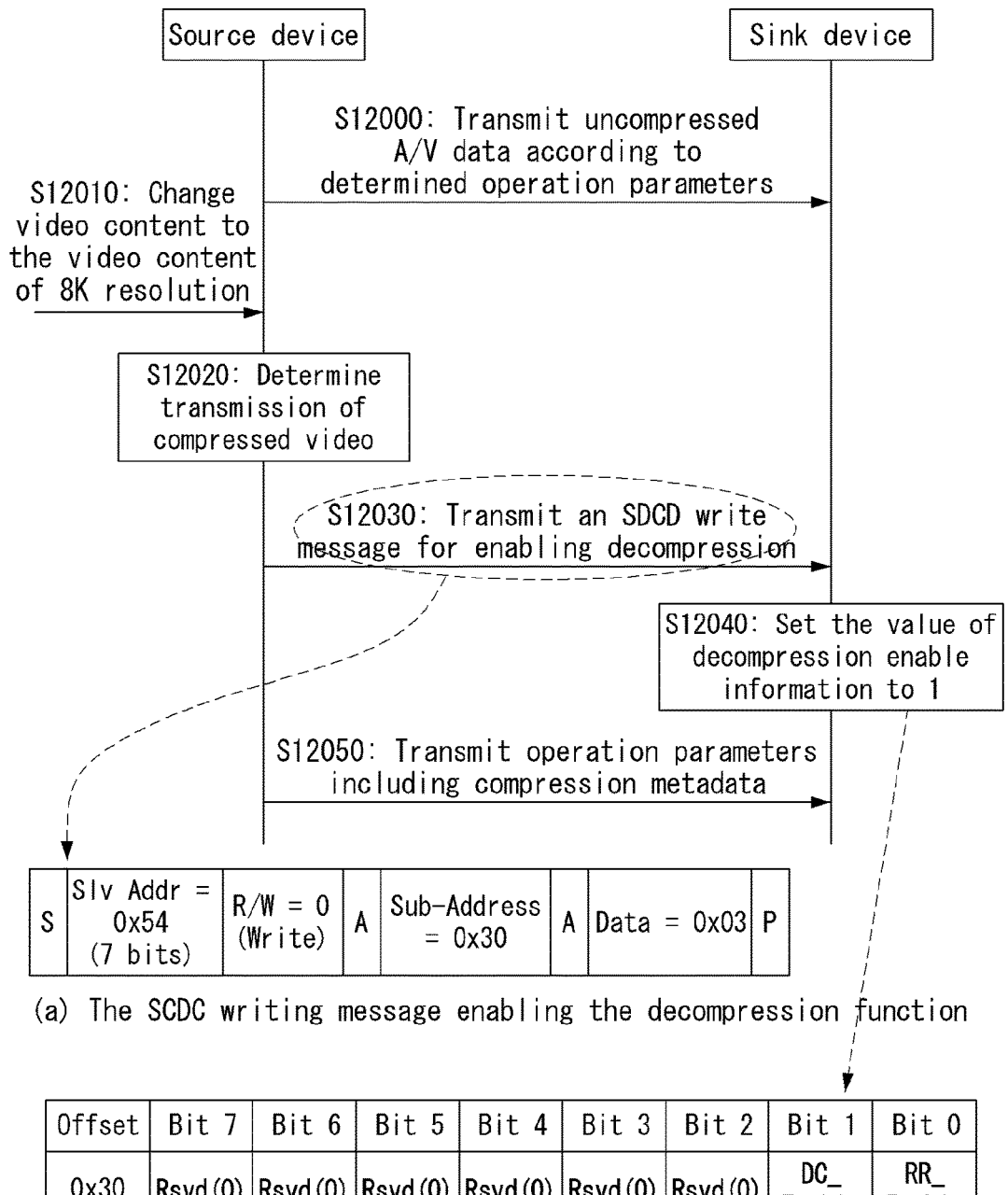

[Fig. 13]
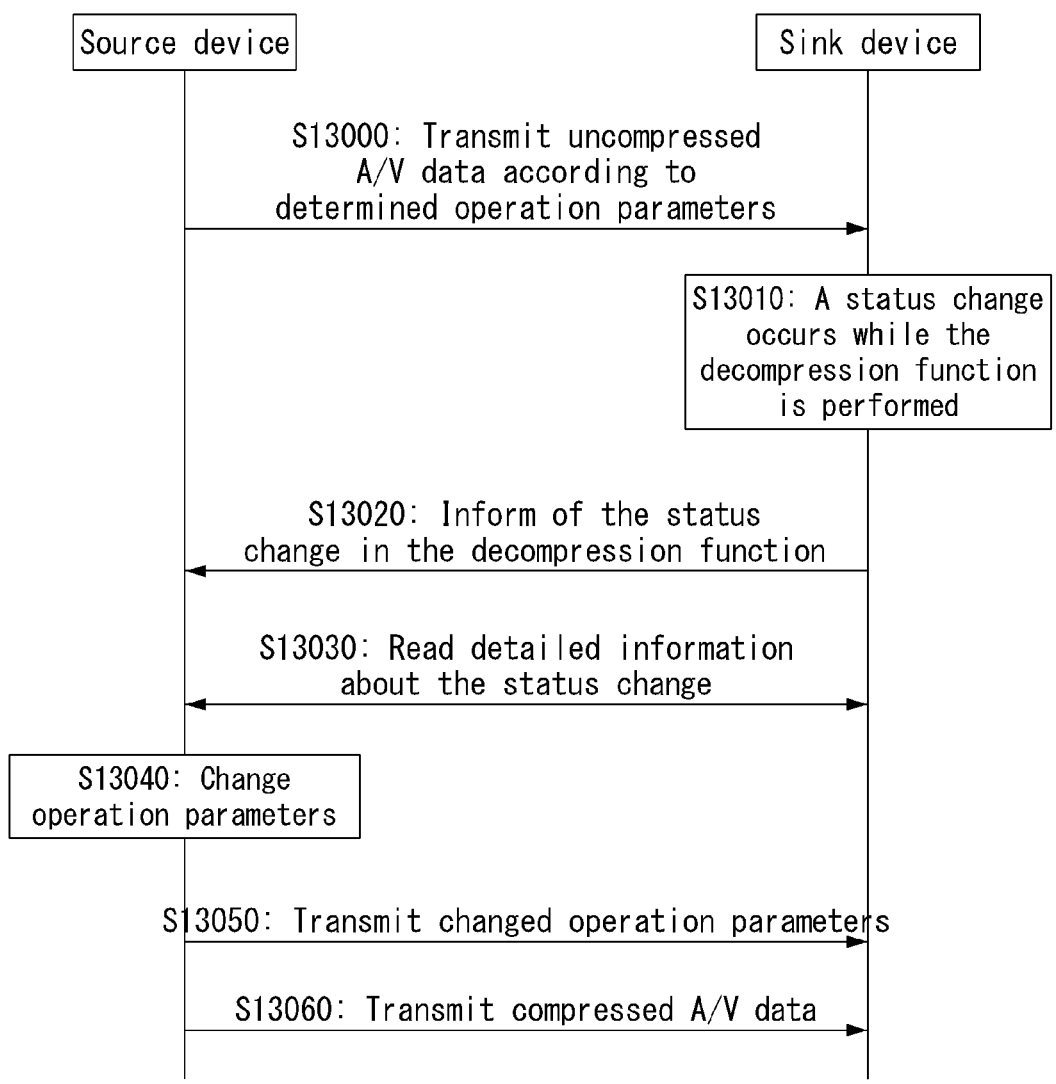

【Fig. 14】
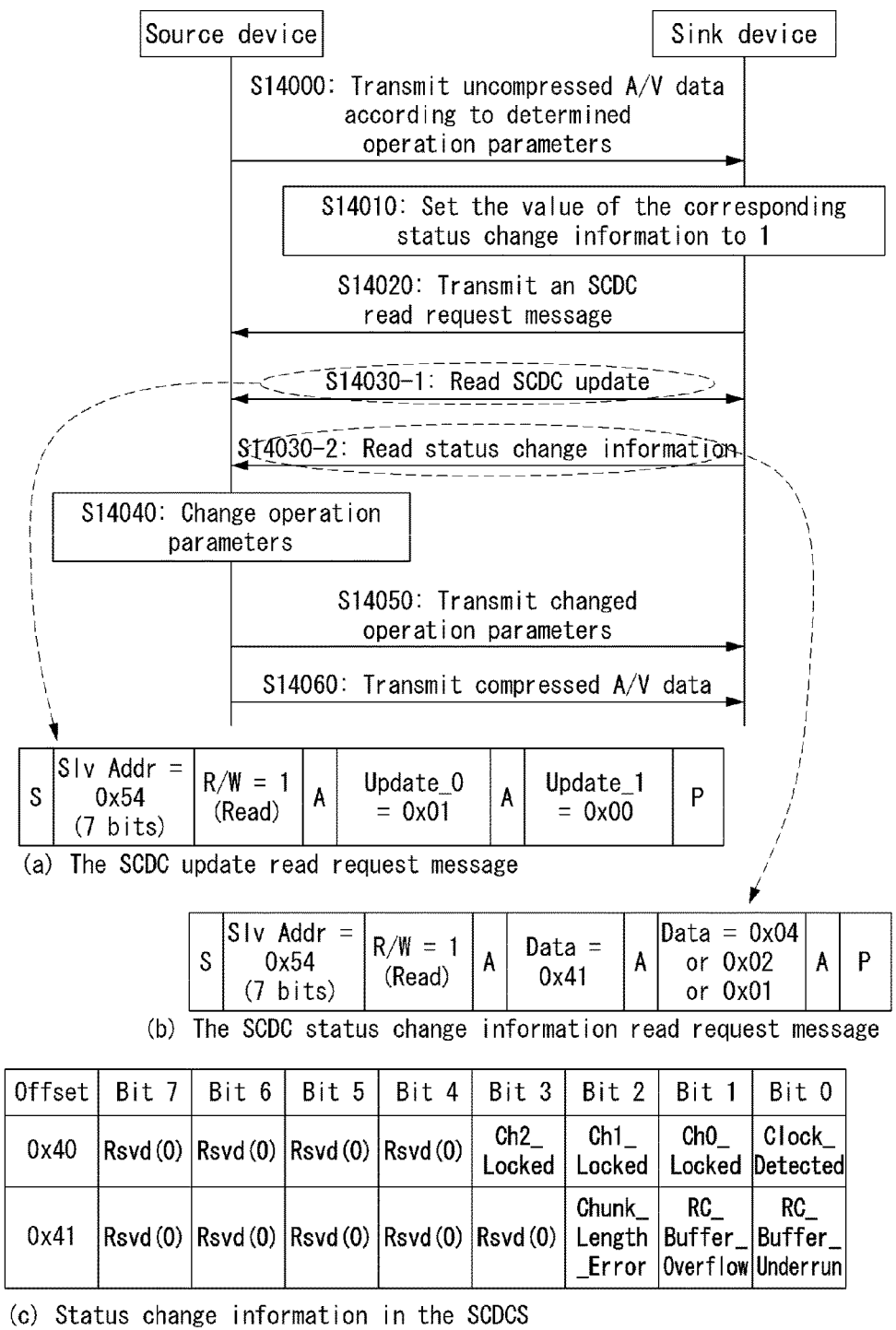

【Fig. 15】

| Byte/Bits # | 7 | 6 | 5 | 4 | 3 | 2 | 1 | 0 |
|---|---|---|---|---|---|---|---|---|
| 0 | Vendor Specific Tag Code (=3) | | | | Length (=N) | | | |
| 1 | IEEE OUI, Third Octet (0xD8) | | | | | | | |
| 2 | IEEE OUI, Second Octet (0x5D) | | | | | | | |
| 3 | IEEE OUI, First Octet (0xC4) | | | | | | | |
| 4 | Version(=2) | | | | | | | |
| 5 | Max_TMDS_Character_Rate | | | | | | | |
| 6 | SCDC_Present | RR_Capable | Rsvd(0) | Rsvd(0) | LTE_340Mcsc_scramble | Indpendent_view | Dual_View | 3D_OSD_Disparity |
| 7 | Rsvd(0) | Rsvd(0) | Rsvd(0) | Rsvd(0) | Rsvd(0) | DC_48bit_420 | DC_36bit_420 | DC_30bit_420 |
| 8 | Compression_version_major | | | | Compression_version_minor | | | |
| 9 | Rsvd(0) | | | | | | Rc_Buffer_Block_Size | |
| 10 | Rc_Buffer_Size | | | | | | | |
| 11 | Rsvd(0) | Rsvd(0) | Rsvd(0) | Rsvd(0) | 4_Slice_Per_Line | Rsvd(0) | 2_Slice_Per_Line | 1_Slice_Per_Line |
| 12 | Rsvd(0) | | | | | | Line_Buffer_Bit_Depth | |
| 13 | Max_bits_per_pixel[7:0] | | | | | | | |
| 14 | Rsvd(0) | | | | | | Max_bits_per_pixel[9:8] | |
| 15 | CD_12bit | CD_10bit | CD_8bit | CD_6bit | YCbCr_420 | YCbCr_422 | YCbCr_444 | RGB |
| N | Rsvd(0) | | | | | | | |

[Fig. 16]

| Packet Byte # | 7 | 6 | 5 | 4 | 3 | 2 | 1 | 0 |
|---|---|---|---|---|---|---|---|---|
| PB0 | Checksum ||||||||
| PB1 | IEEE OUI, Third Octet (0xD8) ||||||||
| PB2 | IEEE OUI, Second Octet (0x5D) ||||||||
| PB3 | IEEE OUI, First Octet (0xC4) ||||||||
| PB4 | Version(=2) ||||||||
| PB5 | Rsvd(0) | Rsvd(0) | Rsvd(0) | Rsvd(0) | Rsvd(0) | Rsvd(0) | Rsvd(0) | 3D_Valid |
| (PB6)* | 3D_F_Structure |||| 3D_Additional_Info_Present | 3D_Disparity_Data_Present | 3D_Meta_Present | Rsvd(0) |
| (PB7)* | 3D_F_Ext_Data |||| Rsvd(0) ||||
| (PB8)* | Rsvd(0) | Rsvd(0) | Rsvd(0) | 3D_Dual_view | 3D_View Dependency || 3D_Preferred 2DView ||
| (PB9)* | 3D_DisparityData_Version ||| 3D_DisparityData_length(J) |||||
| (PB9+1)* | 3D_DisparityData_1 ||||||||
| ... | ... ||||||||
| (PB9+J)* | 3D_DisparityData_J ||||||||
| (PBm)* | 3D_MetaData_type ||| 3D_MetaData_length(K) |||||
| (PBm+1)* | 3D_Metadata_1 ||||||||
| ... | ... ||||||||
| (PBm+K)* | 3D_Metadata_K ||||||||
| (PBn)** | compression_version_major |||| compression_version_minor ||||
| (PBn+1)** | pps_identifier ||||||||
| (PBn+2)** | Bits_per_component |||| Linebuf_depth ||||
| (PBn+3)** | Rsvd(0) | Block_pred_enable | Convert_rgb | Enable_422 | Enable_420 | vbr enable | Bits per_pixel [1:0] ||
| (PBn+4)** | Bits_per_pixel[7:0] ||||||||
| (PBn+5)** (PBn+6)** | Pic_height ||||||||
| (PBn+7)** (PBn+8)** | Pic_width ||||||||
| (PBn+9)** (PBn+10)** | Slice_height ||||||||
| (PBn+11)** (PBn+12)** | Slice_width ||||||||
| (PBn+13)** (PBn+14)** | Chunk_size ||||||||
| (PBn+15)** | Rsvd(0) |||||| initial_xmit_dely ||
| (PBn+16)** (PBn+17)** | initial_dec_delay ||||||||
| (PBn+18)** | Rsvd(0) | Initial_scale_value |||||||

[Fig. 17]

| Packet Byte # | 7 | 6 | 5 | 4 | 3 | 2 | 1 | 0 |
|---|---|---|---|---|---|---|---|---|
| (PBn+19)** | \multicolumn{8}{c}{Scale_increment_interval} ||||||||
| (PBn+20)** | Scale_increment_interval |||||||| 
| (PBn+21)** | Rsvd(0) | | | | Scale_decrement_interval[3:0] | | | |
| (PBn+22)** | Scale_decrement_interval[15:4] ||||||||
| (PBn+23)** | Rsvd(0) | | | first_line_bpg_offset | | | | |
| (PBn+24)** | Nfl_bpg_offset ||||||||
| (PBn+25)** | Nfl_bpg_offset ||||||||
| (PBn+26)** | Slice_bpg_offset ||||||||
| (PBn+27)** | Slice_bpg_offset ||||||||
| (PBn+28)** | Initial_offset ||||||||
| (PBn+29)** | Initial_offset ||||||||
| (PBn+30)** | Final_offset ||||||||
| (PBn+31)** | Final_offset ||||||||
| (PBn+32)** | Rsvd(0) | | | Flatness_min_qp | | | | |
| (PBn+32)** | Rsvd(0) | | | Flatness_max_qp | | | | |
| (PBn+33)** | Rc_model_size ||||||||
| (PBn+34)** | Rc_model_size ||||||||
| (PBn+35)** | Rsvd(0) | | | | Rc_edge_factor | | | |
| (PBn+36)** | Rsvd(0) | | | | Rc_quant_incr_limit0 | | | |
| (PBn+37)** | Rsvd(0) | | | | Rc_quant_incr_limit1 | | | |
| (PBn+38)** | Rc_tgt_offset_hi | | | | Rc_tgt_offset_lo | | | |
| (PBn+39)** | Rc_buf_thresh0 ||||||||
| ... | ... ||||||||
| (PBn+52)** | Rc_buf_thresh7 ||||||||
| (PBn+53)** | Rc_range_parameters0 ||||||||
| ... | ... ||||||||
| (PBn+82)** | Rc_range_parameters29 ||||||||
| ...PB(Nv) | Rsvd(0) | Rsvd(0) | Rsvd(0) | Rsvd(0) | Rsvd(0) | Rsvd(0) | Rsvd(0) | Rsvd(0) |

[Fig. 18]

| Packet Byte # | 7 | 6 | 5 | 4 | 3 | 2 | 1 | 0 |
|---|---|---|---|---|---|---|---|---|
| HB0 | 1 | 0 | 0 | 0 | 0 | 1 | 1 | 0 |
| HB1 | compression_version_major | | | | compression_version_minor | | | |
| HB2 | Rsvd(0) | Rsvd(0) | Rsvd(0) | Rsvd(0) | Rsvd(0) | Rsvd(0) | Rsvd(0) | Rsvd(0) |
| PB1 | pps_identifier | | | | | | | |
| PB2 | Bits_per_component | | | | Linebuf_depth | | | |
| PB3 | Rsvd(0) | Block_pred_enable | Convert_rgb | Enable_422 | Enable_420 | Vbr_enable | Bits_per_pixel [1:0] | |
| PB4 | Bits_per_pixel[7:0] | | | | | | | |
| PB5 | Pic_height | | | | | | | |
| PB6 | | | | | | | | |
| PB7 | Pic_width | | | | | | | |
| PB8 | | | | | | | | |
| PB9 | Slice_height | | | | | | | |
| PB10 | | | | | | | | |
| PB11 | Slice_width | | | | | | | |
| PB12 | | | | | | | | |
| PB13 | Chunk_size | | | | | | | |
| PB14 | | | | | | | | |
| PB15 | Rsvd(0) | | | | initial_xmit_delay | | | |
| PB16 | initial_dec_delay | | | | | | | |
| PB17 | | | | | | | | |
| PB18 | Rsvd(0) | | | Initial_scale_value | | | | |
| PB19 | Scale_increment_interval | | | | | | | |
| PB20 | | | | | | | | |
| PB21 | Rsvd(0) | | | | Scale_decrement_interval[3:0] | | | |
| PB22 | Scale_decrement_interval[15:4] | | | | | | | |
| PB23 | Rsvd(0) | | | | first_line_bpg_offset | | | |
| PB24 | Nfl_bpg_offset | | | | | | | |
| PB25 | | | | | | | | |
| PB26 | Slice_bpg_offset | | | | | | | |
| PB27 | | | | | | | | |

【Fig. 19】

| Packet Byte # | 7 | 6 | 5 | 4 | 3 | 2 | 1 | 0 |
|---|---|---|---|---|---|---|---|---|
| HB0 | 1 | 0 | 0 | 0 | 0 | 1 | 1 | 0 |
| HB1 | compression_version_major | | | | compression_version_minor | | | |
| HB2 | Rsvd(0) | Rsvd(0) | Rsvd(0) | Rsvd(0) | Rsvd(0) | Rsvd(0) | Rsvd(0) | Rsvd(0) |
| PB1 | Initial_offset | | | | | | | |
| PB2 | | | | | | | | |
| PB3 | Final_offset | | | | | | | |
| PB4 | | | | | | | | |
| PB5 | Rsvd(0) | | | | Flatness_min_qp | | | |
| PB6 | Rsvd(0) | | | | Flatness_max_qp | | | |
| PB7 | Rc_model_size | | | | | | | |
| PB8 | | | | | | | | |
| PB9 | Rsvd(0) | | | | Rc_edge_factor | | | |
| PB10 | Rsvd(0) | | | | Rc_quant_incr_limit0 | | | |
| PB11 | Rsvd(0) | | | | Rc_quant_incr_limit1 | | | |
| PB12 | Rc_tgt_offset_hi | | | | Rc_tgt_offset_lo | | | |
| PB13 | Rc_buf_thresh0 | | | | | | | |
| ... | ... | | | | | | | |
| PB20 | Rc_buf_thresh7 | | | | | | | |
| PB21 | Rc_range_parameters0 | | | | | | | |
| ... | ... | | | | | | | |
| PB27 | Rc_range_parameters6 | | | | | | | |

【Fig. 20】

| Packet Byte # | 7 | 6 | 5 | 4 | 3 | 2 | 1 | 0 |
|---|---|---|---|---|---|---|---|---|
| HB0 | 1 | 0 | 0 | 0 | 0 | 1 | 1 | 0 |
| HB1 | compression_version_major | | | | compression_version_minor | | | |
| HB2 | Rsvd(0) | Rsvd(0) | Rsvd(0) | Rsvd(0) | Rsvd(0) | Rsvd(0) | Rsvd(0) | Rsvd(0) |
| PB1 | Rc_range_parameters7 | | | | | | | |
| ... | ... | | | | | | | |
| PB23 | Rc_range_parameters29 | | | | | | | |

DEVICE AND METHOD FOR TRANSMITTING AND RECEIVING DATA USING HDMI

CROSS-REFERENCE TO RELATED APPLICATIONS

This application is the National Stage filing under 35 U.S.C. 371 of International Application No. PCT/KR2015/002418, filed on Mar. 12, 2015, which claims the benefit of U.S. Provisional Application No. 61/952,139, filed on Mar. 13, 2014, the contents of which are all hereby incorporated by reference herein in their entirety.

TECHNICAL FIELD

The present invention is related to a device and a method for transmitting and receiving data using HDMI (High Definition Multimedia Interface) and more specifically, a device and a method for transmitting and receiving data using HDMI which compress and transmit high-capacity data and decompress received data through HDMI.

BACKGROUND ART

HDMI is an interface/standard that develops a Digital Visual Interface (DVI) which is an interface standard of personal computers and displays for a use of AV electronic products. Since the HDMI transmits video/audio from a player to a display device without compressing it, there is very little latency between a source device and a sink device. And the HDMI has high format compatibility since the HDMI does not require separate decoder chip or software. In addition, the HDMI is available to make wirings between AV devices be simplified, which were complicated because video signals, audio signals and control signals are transmitted on only one cable, and the HDMI provides a High-bandwidth Digital Content Protection (HDCP) technique, thereby providing the copyright protection function.

INVENTION CONTENT

Technical Problem

Due to the advance of display devices and the needs of users to watch high-resolution TV, size of video contents is increasing gradually. Display devices with Ultra-HD (U-HD) resolution have already been released on the market beyond full-HD resolution. U-HD is also called 4K resolution or UD resolution, which has four times as many pixels as full-HD and thus can display quite high definition images.

As UHD TVs are spreading, UHD contents are now being distributed in various forms of storage media and through various services to provide the users with a vivid sense of realism and immersion through UHD TVs. The user can enjoy UHD contents in uncompressed video by connecting an external source device such as a UHD TV, set-top box, and Blu-ray disc player via a wired video interface such as HDMI. However, if UHD resolution exceeds 8K, it becomes impossible to transfer uncompressed video due to physical limitation of the existing wired video interface. To overcome this limitation, methods for transmitting losslessly compressed video from a source device and uncompressing the video in a sink device are under development.

The present invention proposes a method for exchanging compression and decompression characteristic information between a source device and a sink device, controlling a decompression function, and transmitting status change information. Thus the present invention delivers exact compression characteristic information to the sink device and enables the sink device to perform decompression exactly, thereby providing an environment in which the user can watch UHD contents in optimal conditions.

Technical Solution

To solve the technical problem above, a method for transmitting and receiving data of a source device that transmits compressed video data by using HDMI (High Definition Media Interface) according to the present invention comprises requesting a sink device to read out EDID (Extended Display Identification Data) when the sink device is connected; receiving from the sink device EDID including decompression capability information of the sink device; transmitting operation parameter information determined on the basis of the EDID, where the operation parameter information includes compression metadata; and transmitting the compressed video data.

Also, in a method for transmitting and receiving data of a source device according to the present invention, the decompression capability information represents at least one of the information about whether the sink device supports decompression or decompression-related characteristic information, where the decompression capability information is received in the form of HF-VSDB (HDIM Forum-Vendor Specific Data Block).

Also, in a method for transmitting and receiving data of a source device according to the present invention, the compression metadata include characteristic information of the compressed video data and are transmitted as an InfoFrame.

Also, in a method for transmitting and receiving data of a source device according to the present invention further comprises enabling or disabling a decompression function of the sink device, and enabling or disabling the decompression function is performed by using decompression enable information included in the SCDCS (Status and Control Data Channel Structure) of the sink device.

Also, a method for transmitting and receiving data of a source device according to the present invention further comprises reading out status change information included in the SCDCS of the sink device in case a change occurs in the status of the decompression function of the sink device.

To solve the technical problem above, a source device transmitting compressed video data using HDMI according to the present invention comprises an HDMI transmitter transmitting and receiving data through HDMI; a video encoding unit compressing video data transmitted through the HDMI; and a control unit controlling the HDMI transmitter and the video encoding unit, wherein the source device requests a sink device to read out EDID (Extended Display Identification Data) when the sink device is connected, receives EDID including decompression capability information of the sink device, transmits operation parameter information determined on the basis of the EDID, wherein the operation parameter information includes compression metadata, and transmits the compressed video data.

To solve the technical problem above, a method for transmitting and receiving data of a sink device that receives compressed video data using HDMI (High Definition Media Interface) comprises receiving a request for reading out EDID (Extended Display Identification Data) from a connected source device; transmitting EDID including decompression capability information of the sink device to the source device; receiving operation parameter information including compression metadata from the source device; and receiving the compressed video data.

Also, in a method for transmitting and receiving data of a sink device according to the present invention, the decompression capability information represents at least one of information about whether the sink device supports decompression or decompression-related characteristic information, where the decompression capability information is transmitted in the form of HF-VSDB (HDIM Forum-Vendor Specific Data Block).

Also, in a method for transmitting and receiving data of a sink device according to the present invention, the compression metadata include characteristic information of the compressed video data and are received as an InfoFrame.

Also, in a method for transmitting and receiving data of a sink device according to the present invention further comprises the source device's enabling or disabling a decompression function of the sink device, and enabling or disabling the decompression function is performed by using decompression enable information included in the SCDCS (Status and Control Data Channel Structure) of the sink device.

Also, a method for transmitting and receiving data of a sink device according to the present invention further comprises writing status change information included in the SCDCS (Status and Control Data Channel Structure) of the sink device in case a change occurs in the decompression function of the sink device and transmitting a read request message to the source device.

To solve the technical problem above, a sink device receiving compressed video data using HDMI (High Definition Media Interface) according to the present invention comprises an HDMI receiver transmitting and receiving through HDMI; a video decoding unit decompressing video data received through the HDMI; and a control unit controlling the HDMI receiver and the video decoding unit, wherein the sink device receives a request for reading out EDID (Extended Display Identification Data) from a connected source device, transmits EDID including decompression capability information of the sink device to the source device, receives operation parameter information including compression metadata from the source device, and receives the compressed video data.

Advantageous Effect

According to the present invention, since compressed AN data (at least one of audio data or video data) are transmitted through HDMI, contents of very high resolution can also be supported through HDMI.

Also, according to the present invention, since a source device can know from EDID information whether a sink device is capable of decompression, the source device can transmit compressed or uncompressed video data selectively.

Also, according to the present invention, since a source device transmits compression metadata describing compression properties used to compress video data, a sink device can decompress compressed video data in a proper manner.

Also, according to the present invention, in case a source device transmits compressed video data or transmits uncompressed video data, the decompression function of a sink device can be enabled/disabled through SCDCS. Therefore, the source device can change configuration of the sink device according to the type of video data even if the user does not change configuration of the decompression function of the sink device, thereby removing inconvenience imposed on the user.

Also, according to the present invention, in case a status change occurs in the decompression function of a sink device, the sink device can inform the source device of the change through SCDCS so that the source device can cope with the change by changing operation parameters according to the changed status.

DESCRIPTION OF DRAWINGS

FIG. 1 illustrates an HDMI system and data transmission and reception channels included in the HDMI system according to one embodiment of the present invention.

FIG. 2 illustrates a source device and a sink device in a HDMI system according to an embodiment of the present invention.

FIG. 3 illustrates an EDID structure according to an embodiment of the present invention.

FIGS. 4 to 5 illustrate an embodiment of an EDID extension block.

FIG. 6 illustrates an HF (HDMI Forum)-VSDB (Vendor-Specific Data Block) according to an embodiment of the present invention.

FIG. 7 illustrates an HF (HDMI Forum)-VSDB (Vendor-Specific InfoFrame) according to an embodiment of the present invention.

FIG. 8 illustrates an SCDC (Status and Control Data Channel) structure according to an embodiment of the present invention.

FIG. 9 illustrates a method for transmitting and receiving AN data through HDMI according to an embodiment of the present invention.

FIG. 10 illustrates a method for transmitting and receiving compressed AN data through HDMI according to an embodiment of the present invention.

FIG. 11 illustrates a method for transmitting and receiving compressed AN data through HDMI according to an embodiment of the present invention, in particular, a method for a source device to control a decompression function of a sink device.

FIG. 12 illustrates a method for transmitting and receiving compressed AN data through HDMI according to an embodiment of the present invention, in particular, a method for a source device to enable a decompression function of a sink device using SCDCS.

FIG. 13 illustrates a method for transmitting and receiving compressed AN data through HDMI according to an embodiment of the present invention, in particular, a method for a sink device to inform a source device about a status change of a decompression function.

FIG. 14 illustrates a method for transmitting and receiving compressed AN data through HDMI according to an embodiment of the present invention, in particular, a method for a sink device to inform a source device about a status change of a decompression function using SCDCS.

FIG. 15 illustrates HF-VSDB according to another embodiment of the present invention.

FIGS. 16 and 17 illustrate HF-VSIF according to a yet another embodiment of the present invention.

FIGS. 18 to 20 illustrate video compression InfoFrames according to an embodiment of the present invention.

BEST MODE FOR INVENTION

In what follows, preferred embodiments of the present invention will be described in detail with reference to appended drawings. Detailed descriptions given below with reference to appended drawings are not limited only to those embodiments that can be realized according to the embodiments of the present invention, but they are intended to describe preferred embodiments of the present invention. The following descriptions include specific details to provide thorough understanding of the present invention. However, it should be clearly understood by those skilled in the art that the present invention can be implemented without employing the specific details.

Most terms used in this document are used widely in the corresponding technical field, but part of the terms have been chosen arbitrarily by the applicant, of which the meaning will be described in detail in the following description depending on the needs. Therefore, the present invention should be understood by the intended meaning of used terms rather than their apparent names or immediate implication.

FIG. 1 illustrates an HDMI system and data transmission and reception channels included in the HDMI system according to one embodiment of the present invention.

Devices that transmit and receive video/audio/control data using HDMI can be called collectively an HDMI system, and the HDMI system can comprise a source device 1010, a sink device 1020, and an HDMI cable. In the HDMI system, a device that transmits video/audio data through HDMI corresponds to the source device 1010, a device that receives video/audio data through HDMI corresponds to the sink device 1020, and an HDMI cable supporting data transmission and reception connects the two devices.

As shown in FIG. 1, the HDMI cables and the connectors may perform pairing of four channels that provides a Transition Minimized Differential Signaling (TMDS) data channel and a TMDS clock channel. The TMDS data channels may be used for forwarding video data, audio data and auxiliary data.

Additionally, the HDMI system provides a VESA (Video Electronics Standards Association) DDC (Display Data Channel). The DDC is used for configuration of one source device and one sink device and exchange of status information between them. A CEC protocol can provide a high-level control function among various audio-visual products in a user environment and may be used optionally. Also, an optional HEAC (HDMI Ethernet and Audio Return Channel) may provide Ethernet-compatible data networking among an ARC (Audio Return Channel) and connected devices in the opposite direction from a TMDS.

Video data, audio data and supplementary data may be transmitted and received through three TDMS data channels. Commonly, a TMDS clock runs a video pixel rate, and is transmitted through a TMDS clock channel. The TMDS clock may be used as a reference frequency for data recovery in three TMDS data channels in an HDMI receiver. In a source device, the data of 8 bits per TMDS data channel may be transformed into a sequence of 10 bits of which transition is minimized, which is DC balanced, and transmitted in serial manner with a rate of 10 bits per TMDS clock period.

In order to transmit audio data and supplementary data through the TMDS channel, the HDMI uses a packet structure. In order to attain high reliability for audio data and control data, data may be transmitted in word of 10 bits which is generated by using a BCH error correction code and an error reduction coding.

The source device can figure out configuration information and available functions of the sink device by reading out E-EDID (Enhanced Extended Display Identification Data) of the sink device in the DDC (Display Data Channel). In what follows, the E-EDID may be called EDID information.

A utility line can be used for an optional extension function such as HEAC.

FIG. 2 illustrates a source device and a sink device in a HDMI system according to an embodiment of the present invention.

In the HDMI system, the device that transmits video/audio data through HDMI corresponds to the source device 2100, and the device that receives video/audio data through HDMI corresponds to the sink device 2200.

The source device 2100 can include at least one of a display unit 2110, user input interface unit 2120, video encoding unit (video encoder) 2130, control unit 2140, HDMI transmitter 2150, memory unit 2160, storage unit 2170, multimedia unit 2180, or power supply unit 2190. The sink device 2200 can include at least one of an EDID EEPROM 2210, video decoding unit 2220, display unit 2230, user input interface unit 2240, HDMI receiver 2250, control unit 2260, power supply unit 2270, memory unit 2280, or multimedia unit 2290. In what follows, descriptions about units performing the same operation will not be repeated.

The source device 2100 represents a physical device transmitting or streaming contents stored in the storage unit to the sink device 2200. The source device 2100 can send a request message to the sink device; or receive and process a request message from the sink device. Also, the source device 2100 can provide an UI through which a response message that the sink device 2200 transmits with respect to a transmitted request message is processed and delivered to the user, and in case the source device 2100 includes the display unit 2110, the UI can be displayed.

The sink device 2200 can receive contents from the source device 2100, transmit a request message to the source device 2100, or transmit a response message by processing a message received from the source device 2100. The sink device 2200 can also provide an UI through which a response message received from the source device 2100 is processed and delivered to the user, and in case the sink device 2200 includes the display unit 2230, the UI can be displayed.

The source device 2100 and the sink device 2200 can include a user input interface unit 2120, 2240 that receives the user's action or input, and as an example, the user input interface 2120, 2240 can correspond to a remote controller, voice reception/recognition device, or touch input sensing/receiving device.

The memory unit 2160, 2280 represents a volatile physical device in which various types of data are stored temporarily.

The storage unit 2170 represents a nonvolatile physical device in which various types of data can be stored.

The EDID EEPROM 2210 represents an EEPROM that stores EDID information.

The aforementioned memory unit, storage unit, and EDID EEPROM all perform the function of storing data, which may be called collectively a memory unit.

The display unit 2110, 2230 displays data received through HDMI, data stored in a content storage, or UI on a screen according to the control of the control unit.

The multimedia unit 2180, 2290 plays various types of multimedia contents. The multimedia unit 2180, 2290 may be implemented independently of the control unit 2140, 2260 or implemented as one physical component together with the control unit.

The power supply unit 2190, 2270 supplies power required for operating a source device, sink device, and sub-units belonging to the source and sink devices.

The HDMI transmitter 2150 is the unit that is installed in the source device 2100 and transmits and receives data through HDMI. The HDMI transmitter 2150 transmits and receives data including a command between devices and a request, action, or response message as well as audio/video data.

The video encoding unit 2130 compresses video data to be transmitted through the HDMI transmitter 2150.

The HDMI receiver 2250 is the unit that is installed in the sink device 2200 and transmits and receives data through HDMI. The HDMI receiver 2250 transmits and receives data including a command between device The video decoding unit 2130 performs decompression of compressed video data received through the HDMI receiver 2250.

In what follows, channels, data structure, and functions provided by the HDMI will be described in more detail.

As described above, the HDMI system provides a DDC (Display Data Channel), which is a protocol standard defined by the VESA (Video Electronics Standard Association) specifying transmission of digital information between the monitor and the computer graphic adaptor. HDMI devices can transmit information about display modes supported by the monitor to the graphic adaptor through the DDC, and the graphic adaptor can transmit images to the monitor according to the information. Before the DDC standard is approved, the VGA standard defined four pins (Pin 11, 12, 4, and 15) of an analog VGA connector for the purpose of recognizing monitor types; among the four pins, only the pin 11, 12, and 4 have been actually used, and 7 types of monitor types could be recognized. The following provide DDC specifications for the respective versions.

DDC Version 1 (Approved in 1994)
EDID (Extended Display Identification Data) is defined, which is a binary file format specifying monitoring information.
Pin 12 is used as a data line, and an EDID block of 128 byte is transmitted consecutively from a monitor to a computer.
DDC Version 2 (Approved in 1996)
EDID is no longer defined by the DDC, but specified separately as a companion standard.
DDC version 2 is based on 120 serial bus. Pin 12 is now used as the data line, and pin 15 is used as the clock line of 120 bus.
Pin 9 is used to supply 5V DC power (up to 50 mA) from the computer to the monitor to read the EDID stored in the EEPROM even if the monitor is powered off.
DDC version 2 uses an 8 bit data offset and supports the EDID storage capacity ranging from 28 bytes to 256 bytes.
E-DDC
E-DDC replaces the DDC version 1 and 2, and version 1 was introduced in 1999. To use E-EDID (Enhanced EDID), the E-DDC allows up to 32 Kbytes of display information storage capacity.
By employing a new 120 addressing scheme based on 8-bit segment index (0x00~0x7F), 128 segments (1 segment=256 bytes) can be accessed, by which up to 32 bytes can be accessed.
E-DDC version 1.1 was approved in 2004, which supports a video interface such as HDMI in addition to CE devices and VGA.
E-DDC version 1.2 was approved in 2007, which supports display port and display ID In what follows, EDID provided through the DDC will be described.

FIG. 3 illustrates an EDID structure according to an embodiment of the present invention.

EDID is a data structure containing various types of information about the display device defined in the VESA and can be transmitted to the source device through the DDC channel or read by the source device. In the case of EDID, the data structure of version 1.3 has been used in the IT display device, CE display device, and video interface (HDMI).

FIG. 3 shows an overview of the information represented by the respective addresses in the EDID data structure.

FIGS. 4 to 5 illustrate an embodiment of an EDID extension block.

FIG. 4 illustrates an EDID extension block, FIG. 5(*a*) a video data block, FIG. 5(*b*) an audio data block, and FIG. 5(*c*) a speaker allocation data block.

Timing information specified in the EDID is intended for IT display devices and can use the EDID 1.3 extension block defined in the CEA-861 to represent the timing information of CE display devices. The version 3 CEA extension block is defined in the CEA-861B standard and specifies four optional data blocks (video, audio, speaker allocation, and vendor-specific data block).

In the video data block of FIG. 5(*a*), the short video descriptor represents the video identification code defined in the CEA-861. In the audio data block of FIG. 5(*b*), the short audio descriptor represents the audio format code defined in the CEA-861. In the speaker allocation data block of FIG. 5(*c*), the speaker allocation data block descriptor represents the data block payload defined in the CEA-861.

FIG. 6 illustrates an HF (HDMI Forum)-VSDB (Vendor-Specific Data Block) according to an embodiment of the present invention.

The HF-VSDB shown in FIG. 6 is the data block that defines vendor-specific data, where HDMI can define HDMI-specific data by using the data block. The HF-VSDB can be included in the E-EDID of the sink device, and in that case, it can be positioned at CEA extension version 3 within the E-EDID of the sink device.

The fields included in the HF-VSDB of FIG. 6 are described as follows.

Length field: represents the total length of the data block, of which the minimum value is 7, and the maximum value is 31.

IEEE OUI field: refers to IEEE Organizationally Unique Identifier, and the OUI assigned to the HDMI forum is 0xC45DD8.

Version field: represents the version number of the HF-VSDB (HDMI Forum-VSDB), of which the value is 1.

Max_TMDS_Character_Rate field: represents the maximum TMDS character rate supported. If the sink device does not support the maximum TMDS character rate more than 340 Mcsc, it is set to 0; otherwise, it is set to 1.

3D_OSD_Disparity: when this field is set to 1, it indicates that the sink device supports reception of 3D_OSD_Disparity Indication.

Dual_view: when this field is set to 1, it indicates that the sink device supports reception of dual_view signaling.

Independent_view field: when this field is set to 1, it indicates that the sink device supports reception of 3D independent view signaling.

LTE_340Mcsc_scramble field: when this field is set to 1, it indicates that the sink device supports scrambling when the TMDS character rate is less than 340 Mcsc. And when the SCDC_Present is set to 0, this field also has to be set to 0.

RR_Capable field: when this field is set to 1, it indicates that the sink device can initiate an SCDC read request. And if the SCDC_Present is set to 0, this field also has to be set to 0.

SCDC_Present field: when this field is set to 1, it indicates that the sink device supports the SCDC function.

DC_48 bit_420, DC_36 bit_420, DC_30 bit_420: when these fields are set to 1, it indicates that deep color 4:2:0 pixel encoding is supported by 10 bit/12 bit/16 bit per component.

The present invention is capable of signaling decompression capability information of the sink device through an HF-VSDB of the EDID, which will be described later.

FIG. 7 illustrates an HF (HDMI Forum)-VSIF (Vendor-Specific InfoFrame) according to an embodiment of the present invention.

In FIG. 7, FIG. 7(a) shows the HF-VSIF packet header, FIG. 7(b) shows HF-VSIF packet contents, and they can form the infoframe together. The HF-VSIF is one of the infoframe, where the HF-VSIF packet is provided to support the feature(s) that requests ancillary information for fully identifying stream contents and can be transmitted from the source device to the sink device. As an example, the HF-VSIF may be defined for transmission of 3D video and 2160p video.

In what follows, described are the HF-VSIF packet header of FIG. 7(a) and fields included in the HF-VSIF packet contents of FIG. 7(b).

HF-VSIF Packet Header

Packet Type field: indicates payload type and is identified as 0x81 in the HF-VSIF.

Version field: indicates the version number of the HF-VSIF and has a value of 1.

Length field: indicates the length of the payload.

HF-VSIF Packet Contents

3D_Valid field: indicates that transmission of 3D video data is in progress. If this field is set to 1, the 3D_F_Structure, 3D_Addiotional_Info_Present, 3D_Meta_Present, and 3D_F_Ext_Data field should be activated.

3D_F_Structure field: indicates the transmission format of 3D video data (side-by-side, top-and-bottom, and so on).

3D Additional_Infor_Present field: this field is set to 1 when 3D_DualView, 3D_ViewDependency, and 3D_Preferred2DView information are added.

3D_Disparity_Data_Present field: this filed is set to 1 when 3D disparity data are present.

3D_Meta_Present field: this field is set to 1 when 3D metadata are present.

3D_F_Ext_Data field: indicates a sub-sampling method according to the transmission format of 3D video data.

3D_Dual_View field: this field is set to 1 when 3D dual views are available.

3D_ViewDependency field: describes dependency of the right view or left view with respect to a coded view.

3D_Preferred2DView field: indicates which of the right 3D view and the left 3D view is more appropriate for 2D view.

3D_DisparityData_Version field: indicates the version of 3D disparity data.

3D_DisparityData_length field: indicates the length of 3D disparity data.

3D_DisparityData_1~3D_DisparityData_J field: describe the 3D disparity data.

3D_MetaData_type field: indicates the type of 3D metadata.

3D_MetaData_length field: indicates the length of 3D metadata.

3D_Metadata_1~3D_Metadata_K field: describe 3D metadata.

FIG. 8 illustrates an SCDC (Status and Control Data Channel) structure according to an embodiment of the present invention.

The SCDC (Status and Control Data Channel) corresponds to a point-to-point communication protocol based on which the source device and the sink device exchange data with each other. The SCDC communication can use the aforementioned DDC channel (I2C line). In other words, the SCDC is a one-to-one communication protocol based on the I2C serial communication that enables HDMI source devices and sink devices to exchange data among them. The SCDC includes a mechanism in which the sink device, an I2C slave, requests status check read from the source device, an I2C master, and the source device receiving the request reads the corresponding status from the sink device.

The SCDCS (SCDC Structure) can be stored in the memory of the sink device and include data having the structure as shown in FIG. 8. In FIG. 8, R/W indicates whether the source device can only read or read/write the SCDCS data stored in the sink device.

The fields included in the SCDCS of FIG. 8 are described below.

Sink Version field: provides version information of an SCDCS compliant sink device.

Source Version field: when the SCDCS compliant sink device reads E-EDID from the sink device, and the SCDC_Present of the E-EDID is set to 1, the source version of the SCDCS is set to 1.

Update Flags (Update_0, Update_1) field: when there is a change in the information that the sink device has to inform of the source device (Status, Character Error Detect, and so on), the corresponding bit is set to 1.

TMDS Configuration (TMDS_Config) field: each of the TMDS_Bit_Clock_Ratio and Scrambling_Enable occupies one bit, and if the source device attempts to activate the scrambling function of the sink device, the corresponding bit is set to 1. If the TMDS_Bit_Clock_Ratio is 1/10, this field is set to 0 while it is set to 1 in the case of 1/40.

Scrambler Status field: when the sink device detects a scrambled control code sequence, the corresponding bit is set to 1.

Configuration (Config_0) field: this field is used to configure capability-related information of the source and the sink device. Currently, this field provides only the RR_Enable field that indicates whether the source device supports a read request of the sink device.

Status Flags (Status_Flag_0, Status_Flag_1) field: indicates whether data received through the clock, channel 0, 1, and 2 have been decoded successfully.

Err_Det_0~2_L/H field: represent the LSB and MSB of the error counter detected in the channel 0 to 3.

Err_Det_Checksum field: is implemented so that one byte sum of error detection values of seven registers including checksum becomes 0.

FIG. 9 illustrates a method for transmitting and receiving AN data through HDMI according to an embodiment of the present invention.

FIG. 9 shows an embodiment in which HDMI devices transmit uncompressed AN data (at least one of audio data or video data) from a source device to a sink device.

First, the source device and the sink device are connected to each other through an HDMI cable S9000. If the HDMI cable is connected, the source device changes the 5V power line from the low level to the high level and applies currents S9010. By doing so, the source device can operate the EEPROM and related circuit in which the EDID information of the sink device is stored. By changing the HPD (Hot Plug Detect) line from the low level to the high level S9020, the sink device can inform the source device that the cable has been connected normally, the EDID-related circuit has been activated, and thus the EDID information can be accessed.

Now, the source device can transmit the EDID information read request to the sink device through the DDC S9030. In response to the EDID read request of the source device, the sink device can transmit the EDID information stored in the EEPROM through the DDC S9040. In the embodiment of the present invention, the EDID information can be transmitted as the aforementioned HF-VSDB.

The sink device can determine operation parameters (timing, format, and so on) for the AN data to be transmitted to the sink device by parsing the received EDID information S9050 and transmit to the source device determined operation parameters related to the uncompressed AN data to be transmitted S9060. In the embodiment of the present invention, the operation parameters may be transmitted as the HF-VSIF.

Finally, the source device can transmit uncompressed AN data controlled by the determined operation parameters to the sink device S9070.

FIG. 9 illustrates a method for transmitting uncompressed AN data. However, as described above, in case a source device attempts to transmit ultra-definition resolution video/audio data in a uncompressed form but the physical layer of HDMI does not support sufficient bandwidth, the source device has to transmit video data in a compressed format within the bandwidth that the physical layer is able to support.

However, to this purpose, the sink device has to know whether the source device is capable of decompressing video data compressed and sent by the source device, and the source device also has to inform the sink device about whether the video data to be transmitted are based on a compressed format. In what follows, a method for transmitting and receiving compressed video data through HDMI will be described in more detail. In what follows, descriptions are given by using an example of video data, but the descriptions given in this document and the present invention can be applied in the same way for audio data as well as video data.

FIG. 10 illustrates a method for transmitting and receiving compressed AN data through HDMI according to an embodiment of the present invention.

First, steps from S10000 to S10030 are performed in the same way as the steps from S9000 to S9030 of FIG. 9, and thus descriptions thereof will not be repeated. FIG. 10 includes the operations additional to the diagram of FIG. 9; therefore, the same descriptions as given with respect to FIG. 9 can still be applied for the descriptions of FIG. 10 even if they are not repeated in the diagram of FIG. 10.

In FIG. 10, the sink device which has received a request for reading EDID information can transmit the EDID information including decompression capability information to the source device through the DDC S10040. The transmitted decompression capability information can include information about whether the sink device can process compressed AN data and in that case, information about operation parameters used to configure the compressed AN data. In other words, the decompression capability information can include information about whether the sink device supports a decompression function and related characteristic information. As described above, the EDID information can be read out from the EEPROM and transmitted in the form of the HF-VSDB.

The sink device can parse received EDID information, determines operation parameters (timing, format, and so on) for AN data to be transmitted to the sink device S10050, can transmit to the source device determined operation parameters related to uncompressed AN data to be transmitted S10060. In FIG. 10, the operation parameter being transmitted includes compression metadata. The compression metadata is required to decompress compressed AN data and represents characteristic information of compressed video data.

In the embodiment of the present invention, the operation parameter may be transmitted in the form of HF-VSIF.

Finally, the source device can transmit to the sink device compressed AN data controlled by the determined operation parameters S10070.

FIG. 11 illustrates a method for transmitting and receiving compressed AN data through HDMI according to an embodiment of the present invention, in particular, a method for a source device to control a decompression function of a sink device.

In addition to the descriptions of FIG. 10, FIG. 11 describes a method for enabling or disabling a decompression function of a source device in case the type of data transmitted by the source device is changed from uncompressed data to compressed data or from compressed data to uncompressed data. As shown in FIG. 11, in case it is impossible to transmit video contents played in the source device in a uncompressed format, the source device can determine to transmit the corresponding AN data in a compressed format and request the sink device to enable the decompression function thereof.

The source device can transmit to the sink device uncompressed AN data according to the determined operation parameters S11000. And the user can change the video content in the source device to the video content of 8K resolution S11010. In the present embodiment, it may be difficult to transmit the 8K video content in a uncompressed/lossless format within the bandwidth of a currently connected HDMI cable. In this case, the source device can determined to transmit the 8K video content in a compressed format S11020. The 8K video content is only an example; and the source device can determine whether AN data to be transmitted can be transmitted through uncompressed and lossless transmission within the bandwidth of a currently connected HDMI cable and determine to change the transmission scheme to compressed transmission in case lossless transmission is not affordable.

Now, the source device can request the sink device to enable a decompression function S11030. The sink device can enable the decompression function S11040 and may inform the source device that the decompression function has been enabled.

The source device can transmit operation parameters including compression metadata to the sink device S11050 and transmit compressed AN data controlled by transmitted compression parameters to the sink device S11060.

The source device can determine transmission of uncompressed video data by taking into account various causes S11070. For example, in case uncompressed transmission within HDMI bandwidth is made possible as the user lowers resolution of the video being watched or video content itself being received/streamed is changed to low resolution, the source device can determine transmission of uncompressed video.

The source device can request the sink device to disable the decompression function S11090. The sink device can disable the decompression function according to the request of the source device S11090 and may inform the source device that the decompression function has been disabled. Now the source device can transmit uncompressed AN data to the sink device S11100.

The request of the source device for the sink device to enable and disable the decompression function described above can be performed by using SCDCS, which will be described again below.

FIG. 12 illustrates a method for transmitting and receiving compressed AN data through HDMI according to an embodiment of the present invention, in particular, a method for a source device to enable a decompression function of a sink device using SCDCS.

FIG. 12 is a method of FIG. 11 for the source device to enable/disable the decompression function of the sink device through SCDC and performs the steps of FIG. 11 (S11030, S11040, S11080, and S11090) by using SCDC data communication. Among the steps of FIG. 12, the same steps (S12000, S12010, S12020, and S12050) as those of FIG. 11 (S11000, S11010, S11020, and S11050) will not be repeated.

The present invention defines decompression enable information (DC_Enable) for enabling/disabling the decompression function in the SCDCS. In FIG. 12, the decompression enable information can be defined by using flags or bits as shown in FIG. 12(b). The information included in bit 1 of FIG. 12(b) (DC_Enable) represents the decompression enable information included in the SCDCS. In the embodiment of FIG. 12(b), the decompression enable information is defined in the register positioned at the offset 0x30 of the SCDCS and is defined as bit 1 of the register. If the value of the decompression enable information is set to 1, it indicates that the decompression function has been enabled while, if the value of the decompression enable information is set to 0, it indicates that the decompression function has been disabled. Therefore, the source device can enable/disable the decompression function of the sink device by writing the value of 1 or 0 into the value of the decompression enable information. The decompression enable information can be defined by 1 bit in the Config_0 information part of the SDCDS.

The source device has to enable the decompression function of the sink device to transmit compressed video. To this purpose, the source device can transmit an SCDC writing message that enables the decompression function S12030. FIG. 12(a) shows an example of an SCDC writing message that enables the decompression function. This message represents an SCDC writing message that writes 0x03 into the register separated by 0x30 from the sink device, the slave address of which is 0x54. In other words, the SCDC writing message can include slave address information (Slv Addr=0x54), sub-address information (0x30), and data to be written (Data=0x03).

The sink device can configure the value of the decompression enable information according to the received SCDC writing message S12040. The sink device can configure the bit value of the corresponding address according to the received SCDC writing message. In other words, in the SCDCS of FIG. 12(b), the position values of bit 0 and bit 1 can be set to 1. And the sink device can enable the decompression function of the video decoder according to the value of the changed decompression enable information.

In FIG. 11, the steps of the source device's requesting disabling the decompression function S11080 and sink device's disabling the decompression function S11090 can also be performed similarly as described above. In this case, as in the steps described above (S12030 and S12040), the source device can transmit an SCDC writing message that writes the value of 0 into the decompression enable information, and the sink device can be performed as the value of the decompression enable information is set to 0 according to the received SCDC writing message. The sink device can disable the decompression function of the video decoder according to the value of the changed decompression enable information.

RR_Enable information of FIG. 12(b) can be set to 1 when the source device supports a read-out request whereas it can be set to 0 when the source device supports only polling of an update flag. In the embodiment of FIG. 12, it is assumed that RR_Enable information is set to 1, and the source device supports a read-out request.

FIG. 13 illustrates a method for transmitting and receiving compressed AN data through HDMI according to an embodiment of the present invention, in particular, a method for a sink device to inform a source device about a status change of a decompression function.

In addition to the descriptions of FIG. 10, FIG. 13 describes a method for informing the source device of a status change (for example, overflow/underflow) in case the status change occurs while the sink device receiving compressed AN data performs decompression. The source device can read information about the corresponding status change, change operation parameters, and transmit compressed AN data according to the changed operation parameters.

The source device can transmit compressed AN data according to the determined operation parameters to the sink device S13000.

The sink device can receive compressed AN data and provide contents by decompressing the received compressed AN data. A status change can occur while the sink device performs decompression S13010. In this embodiment, the status change may correspond to buffer overflow or buffer underflow of the video decoder. And the sink device can inform the source device about the status change of the decompression function S13020.

The source device can get to know the occurrence of the status change from the sink device and accordingly read out detailed information/additional information about the status change from the sink device S13030. The source device changes operation parameters on the basis of the read-out detailed information S13040 and transmit changed operation parameters to the sink device S13050. And the source device can transmit compressed AN data controlled by the changed operation parameters S13060. Determination of operation parameters of the source device, transmission of operation parameters including compression metadata, and transmission of compressed AN data can be performed as the steps of FIG. 10 (S10050~S10070).

In FIG. 13, the sink device can inform the source device about the status change occurred while the aforementioned decompression function is performed by using the SCDCS, which will be described again below.

FIG. 14 illustrates a method for transmitting and receiving compressed AN data through HDMI according to an embodiment of the present invention, in particular, a method for a sink device to inform a source device about a status change of a decompression function using SCDCS.

In addition to the descriptions of FIG. 13, FIG. 14 describes a process by using the SCDC, where the sink device updates a status change and informs the source device of the status change, and the source device reads out the status change. In FIG. 14, too, the source device can transmit to the sink device uncompressed AN data according to determined operation parameters S14000.

As described above, in case a status change occurs in the decompression function of the sink device, the sink device can write the status change into the SCDCS as status change information and inform the source device of the status change through the SCDC. The status change information can be positioned at the Status_Flag_1 part of the SCDCS as shown in FIG. 14(c).

The status change information can include at least one of buffer underflow information indicating occurrence of buffer underflow, buffer overflow information indicating buffer overflow, or chunk length error information indicating difference between the chunk size specified in the HF-VSIF and the chunk size of received video data. As shown in FIG. 14(c), the status change information can be positioned over bit 0 to 2 at the offset 0x41 of the SCDCS, and embodiments and descriptions of the fields corresponding to/included in the status change information are as follows.

RC_Buffer_Underrun field: set to 1 when underflow occurs in the RC buffer.

RC_Buffer_Overflow field: set to 1 when overflow occurs in the RC buffer.

Chunk_Length_Error field: can be set to 1 when there is a difference between the chunk size specified in the HF-VSIF and the chunk size of received data.

In the event of a status change as described above, the sink device can set the value of the status change information of the SCDCS corresponding to the occurred status change to 1 S14010. As shown in FIG. 14(c), in the event of different chunk size, buffer overflow, and buffer underflow, the sink device can set the values of the respective status change information fields to 1.

The sink device can transmit an SCDC read request message to the source device S14020. The SCDC read request message is used for the sink device to request the source device to which the sink device is connected to read out a update flag. To inform the source device of the updated status information, the sink device transmits the SCDC read request message to the source device.

The source device can read out the status change information S14030, which can be performed by reading out the update through the SCDC S14030-1 and reading out the status change information corresponding to the update S14030-2.

First, the source device can read the SCDC update information by transmitting an SCDC update read request message of FIG. 14(a) S14030-1. The SCDC update read request message can include slave address information and register address information to be read. In the example of FIG. 14(a), the update read message is used to request to read the register values of Update_0 and Update_1 of the sink device, the slave address of which is 0x54. By writing the corresponding register values to the message received on the bus, the sink device can enable the source device to read the register values.

The source device, which has confirmed the update, can read the status change information of the SCDCS by transmitting the SCDC status change information read request message of FIG. 14(b) S14030-2. The SCDC status change read request message can include slave address information and address information of the register to be read. As shown in FIG. 14(b), the status change information read message is used to request to read status change information carried by the register at the offset 0x41 of the sink device, the slave address of which is 0x54. Since the corresponding data can change the values of bit 0, bit 1, and bit 2 of the register at the offset 0x41, each individual case can assume at least one of the values among 0x01, 0x02, and 0x04. By writing the corresponding register value into the message received on the bus, the sink device can enable the source device to read the status change information.

Afterwards, the process where the source device changes the operation parameters S14040, transmits the changed operation parameters S14050, and transmits compressed AN data S14060 is the same as described with respect to the corresponding operations of FIG. 13.

FIG. 15 illustrates HF-VSDB according to another embodiment of the present invention.

FIG. 15 illustrates an embodiment that further describes decompression capability information in addition to the HF-VSDB shown in FIG. 6. As described above, the HF-VSDB of FIG. 15 is one of EDID information and can include decompression capability information, where the decompression capability information can include fields indicating whether the sink device supports decompression and decompression capability.

FIG. 15 additionally defines a new HF-VSDB and can set the version number of the Version field to 2 to distinguish the new HF-VSDB from that of the previous version. To indicate that the sink device is capable of processing compressed AN data, at least one bit among bit 5 to 4 of byte 6 block and bit 7 to 3 of byte 7 block of the HF-VSDB can be used. As an embodiment, if the corresponding bit is set to 1, it indicates that the sink device is capable of processing (receiving/decompressing) compressed video data whereas, if the corresponding bit is set to 0, it indicates that the sink device is unable to process compressed video.

In what follows, fields of the decompression capability information newly added in FIG. 15 will be described. The decompression capability information can include at least one of the following fields as shown in FIG. 15.

compression_version_major field: indicates a major version of the compression algorithm compression_version_minor field: indicates a minor version of the compression algorithm rc_buffer_block_size field: indicates an rc buffer block size of the decompressor of the sink device.

rc_buffer_size field: indicates an rc buffer size of the decompressor of the sink device.

slice capabilities (1 slice per line, 2 slice per line, 4 slice per line) field: indicates the number of slices supported per line.

line_buffer_bit_depth field: indicates the size of a buffer allocated per line.

block prediction support field: indicates whether the sink device supports block prediction. This field can be positioned at one of bit 5 to 4 of byte 6 or bit 7 to 3 of byte 7.

max_bits_per_pixel field: indicates maximum bits per pixel supported by the decompressor.

color format capabilities (RGB, YCbCr_444, YCbCr_422, YCbCr_420) field: indicates the color format that the sink device supports.

color depth capabilities (CD_6, CD_8, CD_10, CD_12) field: indicates the color depth that the sink device supports.

FIGS. 16 and 17 illustrate HF-VSIF according to a yet another embodiment of the present invention.

FIGS. 16 and 17 illustrate an embodiment that further describes the fields corresponding to the compression metadata that the source device transmits to the sink device to transmit compressed video data in addition to the HF-VSIF shown in FIG. 7. As described in detail above, the HF-VSIF of FIGS. 16 and 17 is one of InfoFrames and can include compression metadata. The HF-VSIF of FIGS. 16 and 17 may be called an InfoFrame.

FIGS. 16 and 17 additionally define a new HF-VSIF and can set the version number of the Version field to 2 to distinguish the new HF-VSIF from that of the previous version. In case the source device transmits compressed video, the source device can inform the sink device by signaling whether the video currently transmitted is compressed video through at least one of bit 7 to 1 of PB5 (the fifth packet byte). In the present embodiment, if the corresponding bit is set to 1, it indicates that compressed video is transmitted whereas, if the corresponding bit is set to 0, it indicates that uncompressed video is transmitted.

The length of packet bytes per packet can be limited to 27 bytes for the VSIF of HDMI. In this case, video compression metadata may have to be transmitted being partitioned into a plurality of packets. In this case, there needs a flag indicating whether a current packet is the last packet representing video compression metadata, and as an example, one of reserved bits belonging to PB5 can be used for this purpose. In other words, if End of Message flag bit indicating the end of transmission data is added to one of the reserved bits of PB5, and the corresponding bit is set to 1, it can indicate that the current packet is the last transmission packet of the message.

In case 3D_Valid field is set to 1, video compression-related metadata can be positioned following 3D_Metadata. However, in case 3D_Valid field is 0, video compression-related metadata may be positioned starting from PB6. (In case 3D_Valid field is 1, the corresponding packet byte is defined as 3D-related information while, if video compression present bit is enabled, the corresponding packet byte can be defined as video compression metadata.)

In what follows, fields of the compression metadata newly added in FIGS. 16 to 17 will be described. The compression metadata can include at least one of the following fields as shown in FIGS. 16 to 17.

compression_version_major field: indicates a major version of the compression algorithm compression_version_minor field: indicates a minor version of the compression algorithm pps_identifier field: is used as the application-specific identifier for identifying different PPS tables from one another.

bits_per_component field: indicates the number of bits allocated to each component (for example, R, G, and B, or Y, Cb, and Cr) of uncompressed video input to the encoder that performs compression.

Linebuf_depth field: indicates line buffer bit depth used to generate streams.

Block_pred_enable field: indicates which of the BP (Block Prediction) and MMAP to select in the decoder. If this field is 0, it indicates that BP is not used.

Convert_rgb field: indicates whether uncompressed video is encoded in RGB or YCbCr color format. If this field is 0, it indicates that YCbCr color space has been used while, if this field is 1, the decoder changes the color model from YCoCg-R to RGB.

Enable_422 field: indicates whether 4:2:2 sampling has been used.

Enable_420 field: indicates 4:2:0 sampling has been used.

vbr_enable field: indicates whether to turn on/off the VBR mode if the VBR mode is supported by the decoder and transport.

Bits_per_pixel field: indicates the number of bits per pixel of encoded video of the encoder that performs compression.

Pic_height, Pic_width field: indicates size of a picture in pixel units. It is recommended that this field is set to a number close to an integer multiple of Slice_width and Slice_height.

sub_sampling_format field: indicates a sub-sampling method of uncompressed video input to the encoder that performs compression.

Slice_height, Slice_width field: indicates the size of each slice.

Chunk_size field: indicates the byte size of chunk used for slice multiplexing.

initial_xmit_delay field: indicates pixel time to be waited in the rate buffer of the encoder before transmission.

initial_dec_delay field: indicates the number of pixel time stored in the rate buffer before the decoder decodes and produces pixel outputs.

initial_scale_value field: indicates the initial value of rcXformScale used at the start part of a slice.

Scale_increment_interval field: indicates the number of group times between rxXformScale factors at the end part of a slice.

Scale_decrement_interval field: indicates the number of group times between rxXformScale factors at the start part of a slice.

first_line_bpg_offset field: indicates the number of additional bits allocated to each group in the first line of a slice.

Nfl_bpg_offset field: indicates the number of cancelled bits allocated for each group after the first line of a slice.

Slice_bpg_offset field: indicates the number of cancelled bits allocated to each group to force a slice constraint during the initial offset in which a program can be operated.

Initial offset field: indicates the initial value for rcXformOffset.

Final offset field: indicates the maximum value of end-of-slice value for rcXformOffset.

Flatness_min_qp field: indicates the minimum value of QP at which flatness is signaled and flatness QP is modified.

Flatness_max_qp field: indicates the maximum value of QP at which flatness is signaled and flatness QP is modified.

Rc_model_size field: indicates the number of bits of RC model.

Rc_edge_factor field: indicates the ratio between current activity and previous activity to check existence of edge.

Rc_quant_incr_limit0 field: indicates QP threshold used for short-term rate control.

Rc_quant_incr_limit1 field: indicates QP threshold used for short-term rate control.

Rc_tgt_offset_hi field: indicates upper end of a variable range of target bits per group allowed by the short-term rate control.

Rc_tgt_offset_lo filed: indicates low end of a variable range of target bits per group allowed by the short-term rate control.

Rc_buf_thresh[14] field: indicates threshold for 15 ranges in the RC model.

Rc_range_parameters[15] field: indicates range_min_qp (5 bits), range_max_qp (5 bits), and rage_bpg_offset (6 bits) with respect to 15 individual range in the RC model.

FIGS. 16 and 17 illustrate an embodiment of transmitting compressed video by adding compression metadata to the HF-VSIF of InfoFrame. In what follows, definition of a separate InfoFrame to transmit compression metadata and a method for using the InfoFrame instead of adding compression metadata to the HF-VSIF will be described.

An InfoFrame is a data structure delivered from the source device to the sink device through HDMI. An InfoFrame can be used to deliver auxiliary information about a video stream, audio stream, or source device. An InfoFrame includes a packet header and packet content.

Table 1 shows packet types transmitted and received through HDMI.

[표 1]

| Packet type value | Packet type |
| --- | --- |
| 0x00 | Null |
| 0x01 | Audio Clock Regeneration |
| 0x02 | Audio Sample |
| 0x03 | General Control |
| 0x04 | ACP packet |
| 0x05 | ISRC1 packet |
| 0x06 | ISRC2 packet |
| 0x07 | one Bit Audio Sample |
| 0x08 | DST audio packet |
| 0x09 | High Bitrate Audio Stream Packet |
| 0x0A | Gamut metadata packet |
| 0x80 + InfoFrame type | InfoFrame packet |
| 0x81 | Vendor-Specific InfoFrame |
| 0x82 | AVI InfoFrame |
| 0x83 | Source product descriptor InfoFrame |
| 0x84 | Audio InfoFrame |
| 0x85 | MPEG source InfoFrame |
| 0x86 | Video compression InfoFrame |
| 0x0B | 3D audio sample packet (L-PCM format only) |
| 0x0C | 1 bit 3D audio sample packet |
| 0x0D | Audio metadata packet |
| 0x0E | Multi-stream audio sample packet |
| 0x0F | 1 bit multi-stream audio sample packet |

As shown in Table 1, the HF-VSIF of FIGS. 16 and 17 can have the packet type value of 0x81. As described in detail above, the present invention can transmit compression-related metadata by adding the metadata to the HF-VSIF as illustrated in FIGS. 16 and 17, and in another embodiment, a separate InfoFrame for transmitting compression metadata can be defined anew. The InfoFrame including compression metadata, newly defined in the present invention, can be called a video compression InfoFrame, and as shown in Table 1, a packet type value of 0x86 can be assigned thereto.

FIGS. 18 to 20 illustrate video compression InfoFrames according to an embodiment of the present invention.

In FIGS. 18 to 20, packet byte number HB0 to HB2 represent packet header bytes, and PB1 to PB27 represent packet contents bytes.

In the packet header, byte HB0 represents packet type. And byte HB1 represents a major version and a minor version of a compression algorithm used by the encoder for encoding video data. In the case of byte HB2, an End of Message bit denoting the last of delivered data is allocated to one of reserved bits positioned in the header, and if the corresponding bit is set to 1, it can indicate the last delivery packet.

As described above with respect to the InfoFrame, the size of packet bytes that can be transmitted through one packet can be limited to 28 bytes. Therefore, to complete delivery within the given constraint, video compression metadata can be divided into three parts as shown in FIGS. 18 to 20 and can be delivered through three packets. However, this is only an example, and the number of packets and contents by which video compression metadata is divided may be varied according to the packet capacity.

The video compression metadata delivered by the packets illustrated in FIGS. 18 to 20 carry the same information as delivered by the packets illustrated in FIGS. 16 and 17, and descriptions given to the fields of FIGS. 16 and 17 can be applied in the same way to the fields of FIGS. 18 to 20.

The present invention defines information about whether the sink device supports a decompression function and decompression characteristic information and a method for the source device to deliver the information to the source device, definition of compression characteristic information of the source device and a method for the source device to deliver the information to the sink device, and definition of status information of the decompression function of the sink device and a method for the sink device to deliver the status information to the source device.

1) Definition of Compression and Decompression Characteristic Information and Method for Exchanging the Information Between the Source Device and the Sink Device When the source device and the sink device are connected to each other, the sink device puts information about whether the sink device supports the decompression function and related characteristic information in the VSDB of the E-EDID and transmits the information to the source device through the DDC. The source device receiving and analyzing the information checks whether the sink device supports the decompression function, if it is found that the sink device supports the decompression function, compresses video on the basis of related characteristic information, puts the characteristic information of the compressed video into the VSIF, and transmits the VSIF to the source device before sending the compressed video. The source device, receiving the VSIF, decompresses compressed video on the basis of the compression characteristic information of the VSIF. The characteristic information of the power that the sink device can support can be all specified in the SCDCS. In writing the compression characteristic information into the VSIF, if the compression characteristic information exceeds the packet body information (28 byte) of the existing, length-limited VSIF, the limited packet body length can be extended to carry the whole compression characteristic information in one VSIF packet. Or the compression characteristic information can be partitioned so that it can be fitted to the existing VSIF packet body length, and the partition information of the partitioned VSIF packets (start, continuation, and end of the partitioned packet) can be written to the VSIF packet header or body.

2) Method for Controlling Operation of the Decompression Function of the Sink Device Before transmitting compressed video to the sink device that supports the decompression function, the source device activates the decompression function of the sink device. To this purpose, a bit indicating enabling and disabling the decompression function is defined in the SCDCS of the sink device. In controlling the defined bit, the decompression function can be enabled by setting the decompression function-related bit defined in the SCDCS of the sink device to 1 through the SCDC. Also, when the source device attempts to send uncompressed video while transmitting compressed video, the decompression function can be disabled by setting the decompression-related bit defined in the SCDCS of the sink device to 0 through the SCDC before sending the uncompressed video.

3) Method for Transmitting Status Change Information of the Decompression Function of the Sink Device To inform the source device about status change information of the decompression function of the sink device, a field indicating the status information is defined in the SCDCS of the sink device, and the sink device informs the source device of the status change through the SCDC in the event of a change in the corresponding field. The source device which has received the status change information, to read detailed information about the changed status, can read the field representing the corresponding status information defined in the SCDCS by accessing the field through the SCDC.

It will be understood by those skilled in the art to which the present invention belongs that the present invention can be modified or changed in various ways without departing from the technical principles or scope of the present invention. Therefore, it is intended that the present invention includes modifications and changes of the present invention provided within the technical scope defined by appended claims and their equivalents.

In this document, the device and the method according to the present invention have been described fully, and descriptions for the device and method can be applied to each other in a complementary manner.

MODE FOR INVENTION

Various embodiments are described in Best mode for invention.

INDUSTRIAL APPLICABILITY

The present invention is used in a series of HDMI fields.

It is apparent to an ordinary skilled person in the art that various modifications and changes may be made without departing from the spirit and scope of the present invention. Accordingly, the present invention is intended to include the modifications and changes of the present invention within the attached claims and the equivalent scope.

The invention claimed is:

1. In a method for transmitting and receiving data of a source device that transmits compressed video data by using HDMI (High Definition Media Interface), the method for transmitting and receiving data of the source device, comprising:
connecting to a sink device through the HDMI;
receiving from the sink device EDID (Extended Display Identification Data) including decompression capability information of the sink device;
enabling a decompression function of the sink device; and
transmitting the compressed video data.

2. The method of claim 1, wherein the decompression capability information represents at least one of the information about whether the sink device supports decompression or decompression-related characteristic information, and
wherein the decompression capability information is received in the form of HF-VSDB (HDIM Forum-Vendor Specific Data Block).

3. The method of claim 1, further comprising transmitting operation parameter information determined on the basis of the EDID, wherein the operation parameter information includes compression metadata, and
wherein the compression metadata include characteristic information of the compressed video data and are transmitted as an InfoFrame.

4. The method of claim 1, wherein the enabling the decompression function is performed by using decompression enable information included in the SCDCS (Status and Control Data Channel Structure) of the sink device.

5. The method of claim 1, further comprising reading out status change information included in the SCDCS of the sink device in case a change occurs in the status of the decompression function of the sink device.

6. In a source device transmitting compressed video data by using HDMI, the source device comprising:
an HDMI transmitter transmitting and receiving data through the HDMI;
a video encoding unit compressing video data transmitted through the HDMI; and
a control unit controlling the HDMI transmitter and the video encoding unit, wherein the source device:
connects to a sink device through the HDMI;
receives EDID (Extended Display Identification Data) including decompression capability information of the sink device,
enables a decompression function of the sink device, and
transmits the compressed video data.

7. The device of claim 6, wherein the decompression capability information represents at least one of the information about whether the sink device supports decompression or decompression-related characteristic information, and
wherein the decompression capability information is received in the form of HF-VSDB (HDIM Forum-Vendor Specific Data Block).

8. The device of claim 6, wherein the source device transmits operation parameter information determined on the basis of the EDID, wherein the operation parameter information includes compression metadata,
wherein the compression metadata include characteristic information of the compressed video data and are transmitted as an InfoFrame.

9. The device of claim 6, wherein the enabling the decompression function is performed by using decompression enable information included in the SCDCS (Status and Control Data Channel Structure) of the sink device.

10. The device of claim 6, wherein the source device reads out status change information included in the SCDCS of the sink device in case a change occurs in the status of the decompression function of the sink device.

11. In a method for transmitting and receiving data of a sink device that receives compressed video data by using HDMI (High Definition Media Interface), the method for transmitting and receiving data of the sink device, comprising:

connecting to a source device through the HDMI;
transmitting EDID (Extended Display Identification Data) including decompression capability information of the sink device to the source device;
enabling a decompression function according to an indication of the source device,
enabling a decompression function according to an indication of the source device, and
receiving the compressed video data.

12. The method of claim 11, wherein the decompression capability information represents at least one of information about whether the sink device supports decompression or decompression-related characteristic information, and
   wherein the decompression capability information is transmitted in the form of HF-VSDB (HDIM Forum-Vendor Specific Data Block).

13. The method of claim 11, further comprising receiving operation parameter information including compression metadata from the source device, and
   wherein the compression metadata include characteristic information of the compressed video data and are received as an InfoFrame.

14. The method of claim 11, wherein the enabling or disabling the decompression function is performed by using decompression enable information included in the SCDCS (Status and Control Data Channel Structure) of the sink device.

15. The method of claim 11, further comprising, in case a change occurs in the decompression function of the sink device, writing status change information in the SCDCS (Status and Control Data Channel Structure) of the sink device, and transmitting a read request message to the source device.

16. In a sink device receiving compressed video data by using HDMI (High Definition Media Interface), the sink device comprising:
   an HDMI receiver transmitting and receiving through the HDMI;
   a video decoding unit decompressing video data received through the HDMI; and
   a control unit controlling the HDMI receiver and the video decoding unit, wherein the sink device:
   connects to a source device through the HDMI;
   transmits EDID (Extended Display Identification Data) including decompression capability information of the sink device to the source device,
   enables a decompression function according to an indication of the source device, and
   receives the compressed video data.

17. The device of claim 16, wherein the decompression capability information represents at least one of information about whether the sink device supports decompression or decompression-related characteristic information, and
   wherein the decompression capability information is transmitted in the form of HF-VSDB (HDIM Forum-Vendor Specific Data Block).

18. The device of claim 16, wherein the sink device receives operation parameter information including compression metadata from the source device, and
   wherein the compression metadata include characteristic information of the compressed video data and are received as an InfoFrame.

19. The device of claim 16, wherein the enabling the decompression function is performed by using decompression enable information included in the SCDCS (Status and Control Data Channel Structure) of the sink device.

20. The device of claim 16, wherein the sink device, in case a change occurs in the decompression function of the sink device, writes status change information in the SCDCS (Status and Control Data Channel Structure) of the sink device and transmits a read request message to the source device.

* * * * *